United States Patent
Ohta et al.

[19]

[11] Patent Number: 6,122,083
[45] Date of Patent: Sep. 19, 2000

[54] MOBILE COMMUNICATION SYSTEM HAVING A SMALL BASE STATION AND EQUIPMENT FOR ITS SYSTEM

[75] Inventors: Yoshiyuki Ohta; Toru Itoh, both of Kanagawa, Japan

[73] Assignee: Fujitsu Limited, Kawasaki, Japan

[21] Appl. No.: 08/317,224

[22] Filed: Oct. 3, 1994

[30] Foreign Application Priority Data

Mar. 18, 1994 [JP] Japan ...................................... 6-049056

[51] Int. Cl.$^7$ ...................................................... H04J 14/08
[52] U.S. Cl. ........................... 359/137; 359/167; 379/56.2
[58] Field of Search ..................................... 359/113, 135, 359/137, 145–147, 167, 194; 379/56; 455/89, 53.1, 54.1, 56.1, 63; 370/29, 95.1, 95.3

[56] References Cited

U.S. PATENT DOCUMENTS

| | | | |
|---|---|---|---|
| 4,754,450 | 6/1988 | Lynk, Jr. et al. | 370/29 |
| 5,001,703 | 3/1991 | Johnson et al. | 370/29 |
| 5,067,173 | 11/1991 | Gordon et al. | 359/167 |

FOREIGN PATENT DOCUMENTS

| | | | |
|---|---|---|---|
| 0143854 | 11/1980 | Japan | 359/145 |
| 60-84034 | 5/1985 | Japan . | |
| 61-285834 | 12/1986 | Japan . | |
| 62-92626 | 4/1987 | Japan . | |
| 0476569 | 3/1992 | Japan | 359/167 |
| 4-78827 | 3/1992 | Japan . | |
| 4196629 | 7/1992 | Japan | 359/167 |

*Primary Examiner*—Kinfe-Michael Negash
*Attorney, Agent, or Firm*—Helfgott & Karas, P.C.

[57] ABSTRACT

A mobile communication system having a small base station provides radio communications between the small base station and a mobile station. The small base station is connected with a central station via an optical transmission line. The central station includes a modulation section which modulates a time-division multiple signal, an electric/optic converter section which converts an output signal of the modulation section to an optical signal, and sends the optical signal to the optical transmission line. The central station further includes an optic/electric converter section which receives an optical signal from the small base station via the optical transmission line, and converts a received optical signal to an electrical signal, and a demodulation section which demodulates an output signal from the optic/electric converter section. The small base station includes an optic/electric converter section which receives the optical signal from the central station via the optical transmission line, and converts the received optical signal to an electrical signal, a transmit amplifier section which amplifies an output signal from the optic/electric converter section, a receive amplifier section which amplifies a received signal from the mobile station. The small base station further includes an electric/optic converter section which converts an output signal from the receive amplifier section to an optical signal, and sends the optical signal to the central station via the optical transmission line, and a transmit/receive switching control section for the mobile station.

26 Claims, 18 Drawing Sheets

MOBILE COMMUNICATION SYSTEM HAVING A SMALL BASE STATION AND EQUIPMENT FOR ITS SYSTEM

BACKGROUND OF THE INVENTION

1. Field of the Invention

The present invention generally relates to a mobile communication system having a small base station and equipment for its system, and more particularly, to a mobile communication system having a small base station which provides radio communications between the small base station and mobile stations, where the small base station is connected with a central station via optical transmission lines.

For the mobile communication system, in which the base station communicates with such mobile stations as land mobile telephones and portable telephones, a variety of communication systems have been proposed, and several systems are in practical use. For a digital communication system, a time-division multiple access/time-division duplex (TDMA/TDD) communication system is well known. For these mobile communication systems, a large number of base stations of small size and low cost are required.

2. Description of the Prior Art

FIG. 1 shows a block diagram of a conventional mobile communication system. This mobile communication system comprises a central station 201, a base station 202, a downlink transmission line $203_1$, an uplink transmission line $203_2$, a mobile station such as the land mobile telephone or the portable telephone 204, a combiner 205, a modulator 206, a high-power amplifier 207, a transmit/receive switch 208, a low-noise amplifier 209, a demodulator 210, a divider 211, a controller 212, and an antenna 213.

The central station 201 is connected with the base station 202 through the downlink transmission line $203_1$ and the uplink transmission line $203_2$ consisting of coaxial cables, etc. A modulated signal at a transmission frequency from the modulator 206 is amplified through the high-power amplifier 207, and the amplified signal is transmitted from the antenna 213 via the transmit/receive switch 208. On the other hand, a received signal at the antenna 213 from the mobile station 204, passes through the transmit/receive switch 208, and is amplified by the low-noise amplifier 209. The amplified signal is then demodulated to a baseband signal by the demodulator 210.

FIG. 2 shows an illustration for explaining a signal frame format of the TDMA/TDD system. One frame (5 ms) consists of four uplink (from the mobile station to the base station) timeslots U1 to U4, and four downlink (from the base station to the mobile station) timeslots D1 to D4, at the same frequency. Each timeslot is allocated to each of subscribers (mobile stations) A, B, C, D, as follows: for example, the uplink timeslot U1 and the downlink timeslot D1 are allocated to the subscriber A, the uplink timeslot U2 and the downlink timeslot D2 are allocated to the subscriber B, the uplink timeslot U3 and the downlink timeslot D3 are allocated to the subscriber C, and the uplink timeslot U4 and the downlink timeslot D4 are allocated to the subscriber D.

The transmit/receive switch 208 in the base station 202 is controlled by the controller 212 so that the antenna 213 is connected with the low-noise amplifier 209 during the uplink timeslot, and the antenna 213 is connected with the high-power amplifier 207 during the downlink timeslot.

As mentioned before, it is hard to miniaturize the conventional base station 202 because many apparatus such as modulator 206 and demodulator 210 must be installed in this base station. Therefore, another mobile communication system having a small base station has been proposed, in which the base station 202 has been miniaturized by installing the modulator 206 and the demodulator 210, etc., into the central station 201, but the base station 202 has been connected with the central station 201 via optical transmission lines.

FIG. 3 shows a block diagram of a typical mobile communication system having a small base station. A configuration that the central station is connected with the small base station via the optical transmission lines, is shown. This system comprises a central station 221, a small base station 222, optical transmission lines 223, and a mobile station 224. The central station 221 further includes a modulator/demodulator (MODEM) 225, a combine/divide section 226, an electric/optic converter section (EO) 227, and optic/electric converter sections (OE) 228, 229. The small base station 222 further includes an optic/electric converter section (OE) 232, a transmit amplifier section (HPA) 233, receive amplifier sections (LNA) 234, 235, electric/optic converter sections (EO) 236, 237, a transmit antenna 238, and receive antennas 239, 240. And a space diversity system is applied for this mobile communication system.

The small base station 222 is constructed with a transmit section 230 consisting of the optic/electric converter section 232 and the transmit amplifier section 233, with a receive section 231 consisting of the electric/optic converter sections 236, 237 and the receive amplifier sections 234, 235. The modulator and demodulator are installed in the central station 221. In this central station 221, a signal is modulated at a different transmission frequency in each modulator/demodulator 225, and each modulated signal is combined in the combine/divide section 226. The combined signal is converted to an optical signal by the electric/optic converter section 227, and the optical signal is transmitted to the small base station 222 via the optical transmission line 223. In the small base station 222, the received optical signal is converted to an electrical signal by the optic/electric converter section 232, and subsequently the electrical signal is amplified through the transmit amplifier section 233, and is transmitted from the transmit antenna 238.

On the other hand, a transmitted signal from the mobile station 224 is received at the antennas 239, 240, and the received signals are respectively amplified through the receive amplifier sections 234, 235. The amplified signals, which indicate signals modulated at the same reception frequency, are converted to optical signals by the electric/optic converter sections 236, 237, and these optical signals are transmitted to the central base station 221 via the optical transmission lines 223. In the central base station 221, the optical signals are converted to electrical signals by the optic/electric converter sections 228, 229, and these electrical signals are divided to each modulator/demodulator 225 by the combine/divider section 226. Each modulator/demodulator 225 demodulates each of the divided signals to a baseband signal. Therefore, such small base station 222 does not need to install the modulator and the demodulator, so that the small base station is suitably applicable for microcell system because of its small size and low cost.

FIG. 4A and FIG. 4B show a graphical representation for explaining transmission and reception performance of an optical signal. FIG. 4A depicts a performance of a semiconductor laser constructing the electric/optic converter section, where a horizontal axis is current $I_L$, a vertical axis is optical output level $P_L$, $I_{th}$ indicates a threshold current, and $I_b$ indicates a bias current. By supplying an operation current having a center value of the bias current $I_b$, to the semiconductor laser, the optical output in relation to the operation current is obtained. FIG. 4B shows a performance of a photodiode constructing the optic/electric converter section, where a horizontal axis is optical input Pp, a vertical axis is output current Ip. An optical signal is converted to an electrical signal so that the current Ip could flow in relation to an amplitude of the optical input Pp.

As mentioned above, the construction of installing the modulator and the demodulator at the central station, and connecting between the central station and the small base station via optical transmission lines, enables miniaturization of the base station. In such system, an interface between the central station and the small base station is defined. For instance, an output level of the combine/divide section 226 in the central station 221 needs to be same as an input level of the transmit amplifier section 233 in the small base station 222, and an output level of the receive amplifier sections 234, 235 in the small base station 222 needs to be same as an input level of the combine/divide section 226 in the central station 221.

In this definition, the output level Pa of the combine/divide section 226 is described as $Pa = n \times P_0$, where n is a number of carriers, and a carrier level is $P_0$. The combine/divide section 226 combines carriers corresponding to the modulator/demodulator 225 installed in the central station 221. However, an actual number of carriers which are combined in the combine/divide section 226 is varied according to activation of each modulator/demodulator 225 by call generation and call termination, so that the output level of the combine/divide section 226 is also varied. And a maximum transmission power of an optical fiber constructing the optical transmission lines 223, is limited by nonlinear phenomena such as induced Raman dispersion, induced Brillouin dispersion, self-phase modulation, and four-wave parametric combining. Further, a maximum transmission power of a semiconductor laser constructing the electric/optic converter section is also limited due to its structure.

Therefore, in the conventional system, an automatic-output control function is generally implemented, whereby the semiconductor laser constructing the electric/optic converter section is controlled to detect the optical output and to feedback the detected value to a driving-current source so as to maintain the optical output constant. Therefore, under this situation the transmit amplifier section 233 in the small base station 222 always receives a constant signal level independent of the number n of the carriers to be combined, and amplifies the signal by a constant gain. Thus, a transmission signal having a constant power level is always transmitted from the small base station 222 regardless of the number of carriers to be combined. In this condition, even if the number n of carriers to be combined increases, a proper transmission level which is proportional to the number n of carriers can not be obtained, so that a problem occurs, in which a receiving signal level at the mobile station is reduced.

On the other hand, as shown in FIG. 3, the small base station 222 includes one transmit antenna 238 and two receive antennas 239, 240. By using one antenna in common for transmitting and receiving as shown in FIG. 1, it enables further miniaturization of the base station. However, when applying the TDMA/TDD system to this configuration, there is a need for transmit/receive switching between the transmit timeslot and the receive timeslot for the mobile station. Furthermore, if applying a circulator as a duplex for the transmit/receive switch, a problem occurs, in which a transmission signal turns into the receive section, and a reception signal turns into the transmit section, because a transmission frequency is the same as a reception frequency.

SUMMARY OF THE INVENTION

It is an object of this invention to provide a mobile communication system having a small base station which is controllable with a relatively-simple configuration, in which the disadvantages described above are eliminated.

The object described above is achieved by a mobile communication system having a small base station, referenced in FIG. 5, which provides radio communications between the small base station and a mobile station, where the small base station is connected to a central station via an optical transmission line, wherein the central station comprises a modulation section which modulates a time-division multiple signal, an electric/optic converter section which converts an output signal of the modulation section to an optical signal, and sends the optical signal to the optical transmission line, an optic/electric converter section which receives the optical signal from the small base station via the optical transmission line, and converts the received optical signal to an electrical signal, and a demodulation section which demodulates an output signal from the optic/electric converter section, and the small base station comprises an optic/electric converter section which receives the optical signal from the central station via the optical transmission line, and converts the received optical signal to an electrical signal, a transmit amplifier section which amplifies an output signal from the optic/electric converter section, a receive amplifier section which amplifies a received signal from the mobile station, an electric/optic converter section which converts an output signal from the receive amplifier section to an optical signal, and sends the optical signal to the central station via the optical transmission line, and a transmit/receive switching control section for the mobile station.

The object described above is also achieved by a mobile communication system having a small base station, which performs a time-division transmit/receive operation using a transmit timeslot and a receive timeslot at the same frequency between the small base station and a mobile station, where the small base station is connected with a central station via an optical transmission line, wherein the central station comprises a modulation section which modulates a time-division multiple signal, an electric/optic converter section which converts an output signal of the modulation section to an optical signal during the transmit timeslot for the mobile station, and sends the optical signal to the optical transmission line, an optic/electric converter section which receives an optical signal from the small base station via the optical transmission line during the receive timeslot for the mobile station, and converts the received optical signal to an electrical signal, and a demodulation section which demodulates an output signal from the optic/electric converter section, and the small base station comprises an optic/electric converter section which receives the optical signal from the central station via the optical transmission line, and converts the received optical signal to an electrical signal, a transmit amplifier section which amplifies an output signal from the optic/electric converter section, a receive amplifier section which amplifies a received signal from the mobile station, an electric/optic converter section which converts an output signal of the receive amplifier section to an optical signal, and sends the optical signal to the central station via the optical transmission line, and a transmit/receive switching control section which detects the output signal of the optic/electric converter section, and discriminates the transmit timeslot for the mobile station, and switches transmit/receive operation for the mobile station using the discriminated transmit timeslot.

The object described above is also achieved by the mobile communication system having a small base station wherein the transmit/receive switching control section in the small base station comprises a discrimination section which discriminates the transmit timeslot for the mobile station from a detected output signal which is obtained by detecting the output signal of the optic/electric converter section, and a changeable switch which supplies an output signal of the transmit amplifier section to an antenna during the transmit timeslot discriminated by the discrimination section, and supplies a received signal from the antenna to the receive amplifier section during the receive timeslot next to the transmit timeslot.

The object described above is also achieved by the mobile communication system having a small base station, wherein the transmit/receive switching control section in the small base station comprises, a discrimination section which discriminates the transmit timeslot for the mobile station from a detected output signal which is obtained by detecting the output signal of the optic/electric converter section, and a control section which activates the transmit amplifier section and deactivates the receive amplifier section during the transmit timeslot discriminated by the discrimination section, or deactivates the transmit amplifier section and activates the receive amplifier section during the receive timeslot next to the transmit timeslot.

The object described above is also achieved by the mobile communication system having a small base station, wherein the transmit/receive switching control section in the small base station comprises, a discrimination section which discriminates the transmit timeslot for the mobile station from a detected output signal which is obtained by detecting the output signal of the optic/electric converter section, and a control section which activates the transmit amplifier section and deactivates the receive amplifier section and the electric/optic converter section during the transmit timeslot discriminated by the discrimination section, or deactivates the transmit amplifier section and activates the receive amplifier section and the electric/optic converter section during the receive timeslot next to the transmit timeslot.

The object described above is also achieved by the mobile communication system having a small base station, wherein the transmit/receive switching control section in the small base station comprises a bandpass filter which receives the output signal of the optic/electric converter, an envelope detector which receives an output signal of the bandpass filter, a comparator which compares an output signal of the envelope detector with a reference voltage, a delay circuit which delays an output signal of the comparator, and an inverting circuit which inverts an output signal of the delay circuit, wherein the output signal of the inverting circuit is used as a discrimination signal of the receive timeslot for the mobile station, and the output signal of the comparator is used as a discrimination signal of the transmit timeslot for the mobile station.

The object described above is also achieved by the mobile communication system having a small base station, wherein the transmit/receive switching control section in the small base station controls the changeable switch for transmit/receive by using both the discrimination signal of the receive timeslot which is the output of the inverting circuit and the discrimination signal of the transmit timeslot which is the output of the comparator.

The object described above is also achieved by the mobile communication system having a small base station, wherein the transmit/receive switching control section in the small base station deactivates the transmit amplifier section and activates the receive amplifier section and the electric/optic converter section by the discrimination signal of the receive timeslot which is the output of the inverting circuit, or activates the transmit amplifier section and deactivates one or either of the receive amplifier section and the electric/optic converter section by the discrimination signal of the transmit timeslot which is the output of the comparator.

The object described above is also achieved by a mobile communication system having a small base station, which provides a time-division transmit/receive operation using a transmit timeslot and a receive timeslot at the same frequency between the small base station and a mobile station, where the small base station is connected with a central station via an optical transmission line, wherein the central station comprises a modulation section which modulates a time-division multiple signal, an electric/optic converter section which converts an output signal of the modulation section to an optical signal during the transmit timeslot for the mobile station, and sends the optical signal to the optical transmission line, an optic/electric converter section which receives the optical signal from the small base station via the optical transmission line during the receive timeslot for the mobile station, and converts a received optical signal to an electrical signal, a demodulation section which demodulates an output signal from the optic/electric converter section, and a control-signal multiplex section which multiplexes a control signal which indicates the transmit timeslot and the receive timeslot to the output signal of the modulation section at a different frequency from that of the output signal, and the small base station comprises an optic/electric converter section which receives the optical signal from the central station via the optical transmission line, and converts the received optical signal to an electrical signal, a transmit amplifier section which amplifies an output signal from the optic/electric converter section, a receive amplifier section which amplifies a received signal from the mobile station, an electric/optic converter section which converts an output signal of the receive amplifier section to an optical signal, and sends the optical signal to the central station via the optical transmission line, and a transmit/receive switching control section which derives the control signal from the output signal of the optic/electric converter, and switches transmit/receive operation for the mobile station by the derived control signal.

The object described above is also achieved by the mobile communication system having a small base station, wherein the transmit/receive switching control section in the small base station comprises a control-signal detecting section which disassembles the output signal of the optic/electric converter and detects the control signal, and a changeable switch which supplies an output signal of the transmit amplifier section to an antenna during the transmit timeslot for the mobile station according to the control signal, and supplies a received signal from the antenna to the receive amplifier section during the receive timeslot according to the control signal.

The object described above is further achieved by the mobile communication system having a small base station, wherein the transmit/receive switching control section in the small base station comprises a control-signal detecting section which disassembles the output signal of the optic/electric converter and detects the control signal, and a control section which activates the transmit amplifier and deactivates the receive amplifier during the transmit timeslot for the mobile station according to the control signal, and deactivates the transmit amplifier and activates the receive amplifier during the receive timeslot according to the control signal.

The object described above is also achieved by the mobile communication system having a small base station, wherein the transmit/receive switching control section in the small base station comprises a control-signal detecting section which disassembles the output signal of the optic/electric converter and detects the control signal, and a control section which activates the transmit amplifier section and deactivates the receive amplifier section and the electric/optic converter section during the transmit timeslot for the mobile station according to the control signal, and deactivates the transmit amplifier section and activates the receive amplifier section and the electric/optic converter section during the receive timeslot according to the control signal.

The object described above is further achieved by the mobile communication system having a small base station wherein the electric/optic converter section in the central station is controlled to be activated during the transmit timeslot for the mobile station, and to be deactivated during the receive timeslot for the mobile station.

In addition, the object described above is achieved by a mobile communication system having a small base station, which provides radio communications between the small base station and a mobile station, where the small base station is connected with a central station via an optical transmission line, wherein the central station comprises a modulation section which modulates a time-division multiple signal, an automatic-gain-control amplifier section which amplifies an output signal of the modulation section, an electric/optic converter section which converts an output signal of the automatic-gain-control amplifier section with gain-control information in the automatic-gain-control amplifier section to an optical signal, and sends the optical signal to the optical transmission line, an optic/electric converter section which receives an optical signal from the small base station via the optical transmission line, and converts the received optical signal to an electrical signal, a gain-control amplifier section which amplifies an output signal of the optic/electric converter section according to gain-control information from the small base station, and a demodulation section which demodulates an output signal of the gain-control amplifier section, and the small base station comprises an optic/electric converter section which receives the optical signal from the central station via the optical transmission line, and converts the received optical signal to an electrical signal, a gain-control amplifier section which amplifies an output signal of the optic/electric converter according to the gain-control information from the central station, a transmit amplifier section which amplifies an output signal of the gain-control amplifier section and transmits an amplified signal, a receive amplifier section which amplifies a received signal from the mobile station, an automatic-gain-control amplifier section which amplifies an output signal of the receive amplifier section, and an electric/optic converter section which converts an output signal of the automatic-gain-control amplifier section with gain-control information in the automatic-gain-control amplifier to an optical signal, and sends the optical signal to the central station via the optical transmission line.

The object described above is also achieved by the mobile communication system having a small base station, wherein the automatic-gain-control amplifier section in the central station, detects an optical output monitor of the electric/optic converter section, and controls gain itself so as to maintain output power of the electric/optic converter section to be a given power level, and the automatic-gain-control amplifier section in the small base station, detects an optical output monitor of the electric/optic converter section, and controls gain itself so as to maintain output power of the electric/optic converter section to be a given power level.

The object described above is further achieved by the mobile communication system having a small base station, wherein the automatic-gain-control amplifier section comprises a processor which processes to correct the gain-control information being combined with the output signal of the automatic-gain-control amplifier section, and processes to correct a gain-control information from the small base station and sends the corrected gain-control information to a gain-control amplifier section.

According to the mobile communication system having the small base station, the small base station comprises the optic/electric converter section, the transmit amplifier section, the receive amplifier section, the electric/optic converter section, and the transmit/receive switching control section. The central station further includes the modulation section and the demodulation section. The central station is connected to the small base station via the optical transmission line. A radio-frequency signal is converted to an optical signal and is transmitted between the central station and the small base station. And the transmit/receive switching control section switches transmission or reception according to the transmit timeslot and the receive timeslot for the mobile station.

According to the mobile communication system having the small base station, this system provides time-division transmit/receive operation between the small base station and the mobile station by using the transmit timeslot and the receive timeslot at the same frequency. In the central station, the electric/optic converter section converts the radio-frequency signal to the optical signal during the transmit timeslot, and sends the optical signal to the small base station. In the small base station, the optic/electric converter section converts this optical signal to the electrical signal, where the transmit timeslot for the mobile station is discriminated from the electrical signal. Therefore, a switching of the transmit/receive is controlled by the detected transmit timeslot.

According to the mobile communication system having the small base station, the central station sends the optical signal during the transmit timeslot for the mobile station, and the small base station detects the output signal (high-frequency signal) of the optic/electric converter section in the transmit/receive switching control section, in which the transmit timeslot is discriminated from the detected output signal. Therefore, the changeable switch is controlled by the discrimination signal, so that the transmit amplifier section is connected to the antenna during the transmit timeslot, and the receive amplifier section is connected to the antenna during the receive timeslot next to the transmit timeslot.

According to the mobile communication system having the small base station, the transmit/receive switching control section in the small base station comprises the discrimination section and the control section. The discrimination section detects the output signal (high-frequency signal) of the optic/electric converter section, and discriminates the transmit timeslot when the detected output signal exists. And the control section controls to activate the transmit amplifier section and to deactivate the receive amplifier section, based on the discrimination signal of the transmit timeslot from the discrimination section. In the receive timeslot next to the transmit timeslot, the control section controls to activate the receive amplifier, and to deactivate the transmit amplifier section. Thus, when the transmit/receive duplex such as a circulator is applied to the transmit/receive switch, the problem that the transmit/receive signal turns to the opposite transmitter or receiver side, can be solved.

According to the mobile communication system having the small base station, the transmit/receive switching control section in the small base station comprises the discrimination section and the control section. The discrimination section detects the output signal (high-frequency signal) of the optic/electric converter and discriminates the transmit timeslot. And the control section controls to activate the transmit amplifier section and controls to deactivate the receive amplifier section and the electric/optic converter section during the transmit timeslot which has been discriminated in the discrimination section. During the receive timeslot next to the transmit timeslot, the control section controls to deactivate the transmit amplifier and controls to activate the receive amplifier section and the electric/optic converter section.

According to the mobile communication system having the small base station, the transmit/receive switching control section in the small base station derives the transmit signal part for the mobile station from the output of the optic/electric converter through the bandpass filter, and detects the transmit signal part by the envelope detector. Next, the comparator compares the output signal of the envelope detector with the reference voltage, and produces the discrimination signal of the transmit timeslot for the mobile station. And the inverting circuit inverts the discrimination signal of the transmit timeslot after passing the delay circuit, and produces the discrimination signal of the receive timeslot.

According to the mobile communication system having the small base station, if the small base station has the transmit/receive-changeable switch which can connect the antenna with either the transmit amplifier section or the receive amplifier section, the changeable switch is controlled to connect the antenna with the receive amplifier section by the discrimination signal of the receive timeslot which is the output signal of the inverting circuit and, on the other hand, the changeable switch is controlled to connect the antenna with the transmit amplifier section by the discrimination signal of the transmit timeslot which is the output signal of the comparator.

According to the mobile communication system having the small base station, by the discrimination signal of the receive timeslot which is the output signal of the invert circuit, the transmit amplifier section is controlled to be deactivated and is in a situation disconnected from the antenna. Under this situation, the receive amplifier section and the electric/optic converter section are controlled to be activated, and the received signal from the mobile station is converted to the optical signal and is transferred to the central station. On the other hand, by the discrimination signal of the transmit timeslot which is the output signal of the comparator, the transmit amplifier section is controlled to be activated and is in a situation connected to the antenna. Under this situation, one or either of the receive amplifier section and the electric/optic converter section is controlled to be deactivated, and the transmit signal is prevented from turning into the receive section.

According to the mobile communication system having the small base station, in the central station, the control signal, which indicates the transmit timeslot and the receive timeslot for the mobile station, is multiplexed with a main signal, and the main signal with the control signal is transferred to the small base station. Namely, at the different frequency from that of the main signal, the control signal is frequency-multiplexed upon the main signal which is the modulated signal at the transmission frequency in the modulation section, and the frequency-multiplexed signal is sent to the electric/optic converter section. The transmit/receive switching section can derive the control signal from the electrically-converted signal of the optic/electric-converter section through the filter. Thus, the control signal enables switching of transmission or reception for the mobile station.

According to the mobile communication system having the small base station, if the small base station has the transmit/receive-changeable switch for connecting the antenna to either the transmit amplifier section or the receive amplifier section, the transmit/receive-changeable control section controls the transmit amplifier section to connect with the antenna during the transmit timeslot, and controls the receive amplifier section to connect with the antenna during the receive timeslot, by means of the control signal derived from the output signal of the optic/electric converter section.

According to the mobile communication system having the small base station, the transmit/receive-changeable control section in the small base station derives the control signal, which indicates the transmit timeslot and the receive timeslot for the mobile station, from the output signal of the optic/electric converter section by the control-signal detecting section. During the transmit timeslot, the derived control signal controls to activate the transmit amplifier section for transmitting to the mobile station, while the receive amplifier section is deactivated under this condition. On the other hand, during the receive timeslot, the control signal controls to deactivate the transmit amplifier section and controls to activate the receive amplifier section for receiving and amplifying the signal from the mobile station.

According to the mobile communication system having the small base station, during the transmit timeslot, the transmit/receive switching control section in the small base station controls to activate the transmit amplifier section and controls to deactivate the receive amplifier section and the electric/optic converter section for transmitting from the antenna to the mobile station. On the other hand, during the receive timeslot, the transmit/receive switching control section controls to deactivate the transmit amplifier section and controls to activate the receive amplifier section and the electric/optic converter section for receiving and processing the signal from the mobile station.

According to the mobile communication system having the small base station, a method whereby the electric/optic converter section in the central station is activated during the transmit timeslot for the mobile station, and is deactivated during the receive timeslot, enables reduction of the power consumption of the electric/optic converter section during the receive timeslot. And if the electric/optic converter section is constructed with the semiconductor laser, controlling the bias current enables the control of activation or deactivation.

According to the mobile communication system having the small base station, in both the central station and the small base station, a respectively-installed automatic-gain-control amplifier section controls to make the optical-signal level which will be sent to the optical transmission lines, to be constant independent of the number of the carriers which are combined. Thus, the above produces the stable optical-signal transmission. At this time, the gain-control information of the automatic-gain-control amplifier section, as the control signal, is multiplexed with the amplified signal at the different frequency from that of the amplified signal, and the multiplexed signal is converted to the stable optical signal. After the optical transmission of the optical signal with the gain-control information, each of the stations receives the gain-control information, and controls the gain-control amplifier section by the gain-control signal. Namely, the gain-control signal controls to increase the gain for a large number of carriers, and on the other hand, the gain-control signal controls to decrease the gain for a small number of the carriers, so that the output-signal level in relation to the number of the carriers is obtained.

According to the mobile communication system having the small base station, for keeping the optical output level of the electric/optic converter section to be at a constant level, the optical output level is detected or the optical monitor signal of the semiconductor laser is detected, and this detected signal is fed back to the automatic-gain-control amplifier section. The gain-control information in the central station is transmitted to the small base station, and the gain-control information in the small base station is transmitted to the central station. In the central station and the small base station, by controlling the automatic-gain-control amplifier section with the received gain-control information, for instance, the output signal, in which the level is relative to the number of the carriers to be combined, is obtained.

According to the mobile communication system having the small base station, the processor which is installed in the automatic-gain-control amplifier section of the central station corrects the gain-control information by including, for instance, a loss of the optical transmission lines, etc., and transmits the corrected information to the small base station. Further, the processor corrects the gain-control information from the small base station by including a loss of the optical transmission lines, and controls the gain of the gain-control-amplifier section in the central station.

Other objects and further features of the present invention will be apparent from the following detailed description when read in conjunction with the accompanying drawings.

DESCRIPTION OF THE PREFERRED EMBODIMENTS

Figure 6:
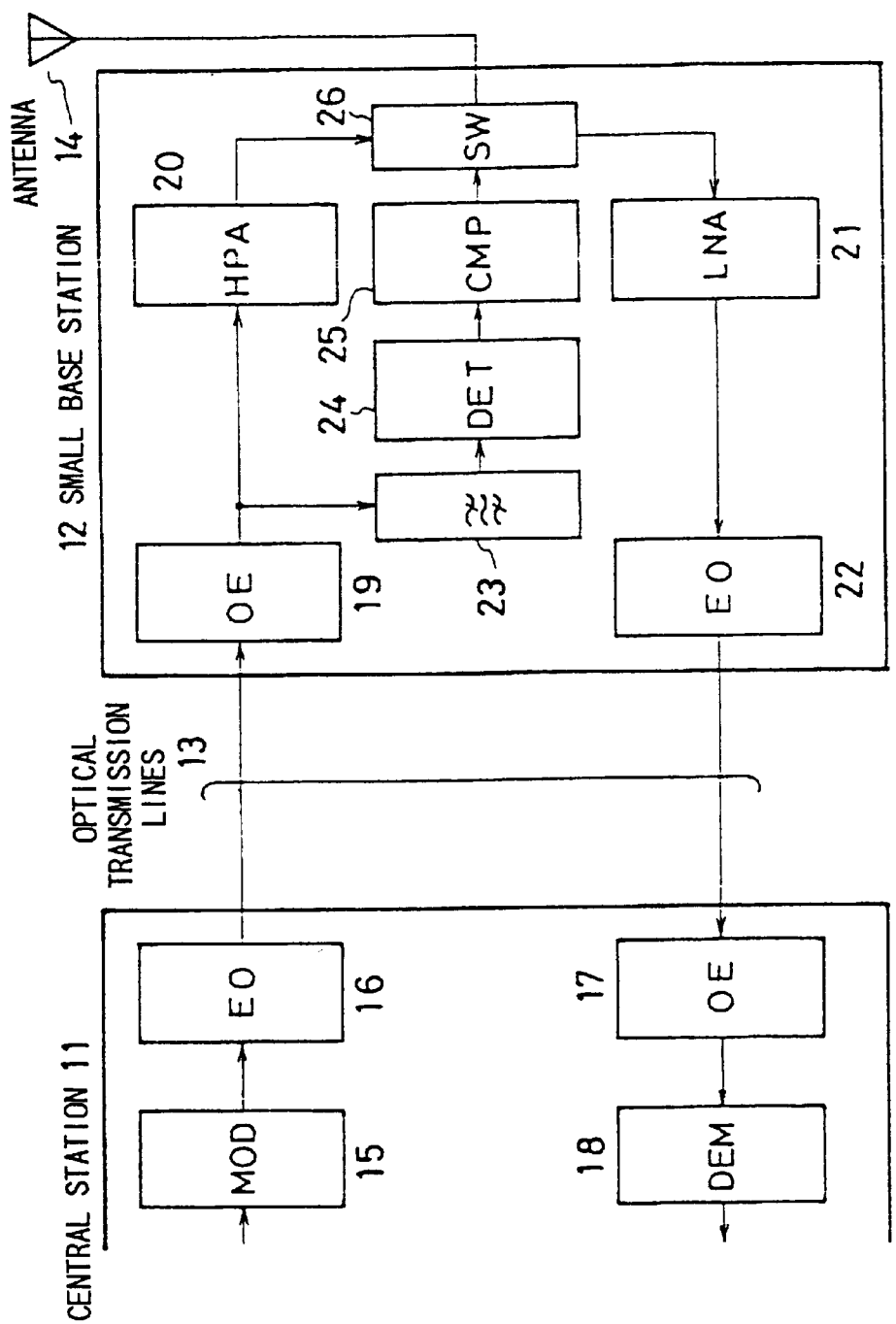
FIG. 6 is a block diagram of a first embodiment according to the present invention.

First, a description will be given of a first embodiment of a mobile communication system having a small base station according to the present invention, by referring to FIG. 6. FIG. 6 shows a block diagram for explaining a configuration of the mobile communication system. The mobile communication system comprises a central station 11, a small base station 12, and optical transmission lines 13 for connecting between the central station 11 and the small base station 12. The central station 11 further includes a modulation section (MOD) 15, an electric/optic converter section (EO) 16, an optic/electric converter section (OE) 17, and a demodulation section (DEM) 18. The small base station 12 further includes an antenna 14, an optic/electric converter section (OE) 19, a high-power transmit amplifier section (HPA) 20, a low-noise receive amplifier section (LNA) 21, an electric/optic converter section (EO) 22, a bandpass filter 23, an envelope detector (DET) 24, a comparator (CMP) 25, and a changeable switch (SW) 26.

Figure 5:
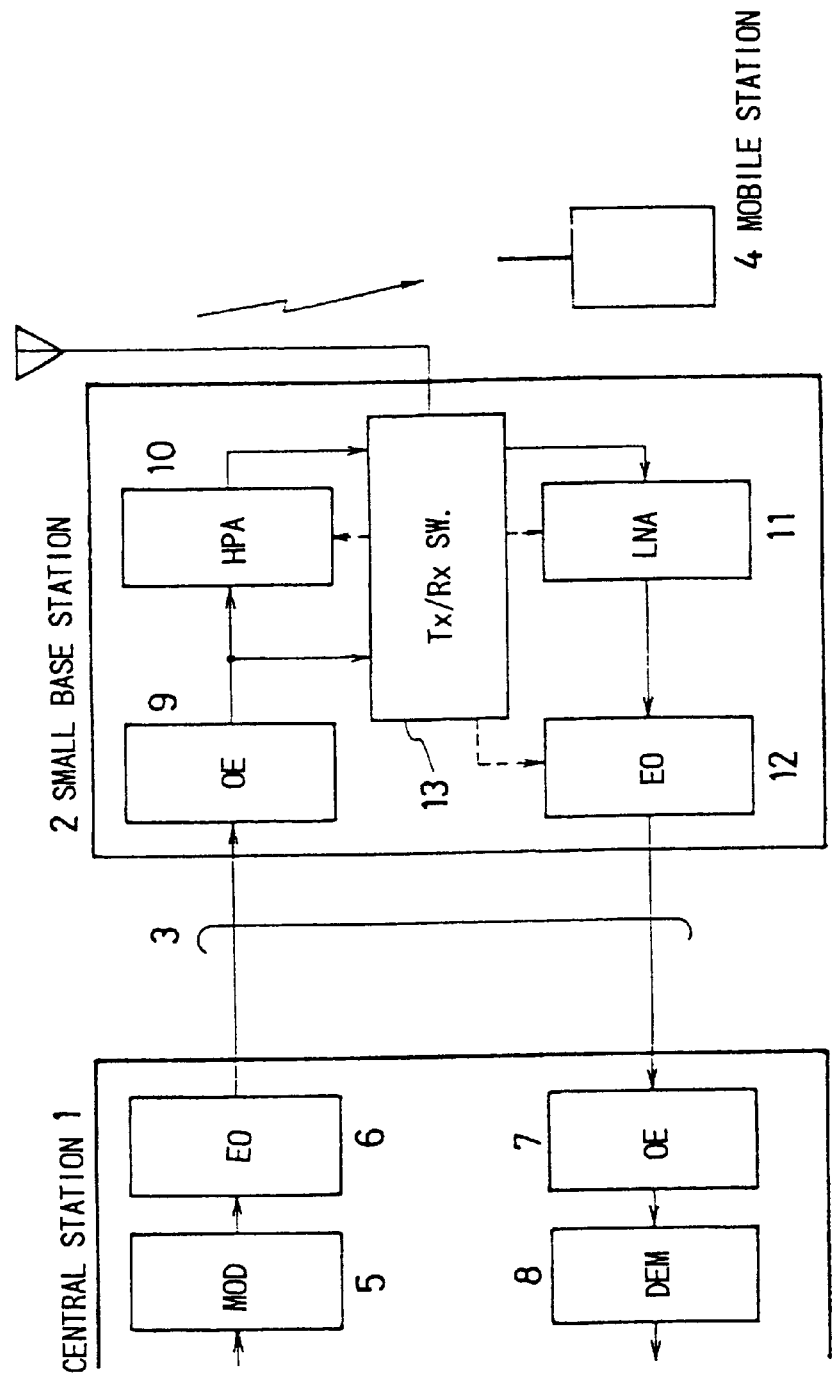
FIG. 5 is a block diagram for explaining a principle of the present invention.

The bandpass filter 23, the envelope detector 24, the comparator 25, and the changeable switch 26 in the small base station 12 correspond to the transmit/receive switching control section in FIG. 5. The changeable switch 26 connects changeably the antenna 14 either to the transmit amplifier section 20 or to the receive amplifier section 21. In this figure, a mobile station which may have a communication with the small base station 12, is not shown for simplification of description.

Figure 1:
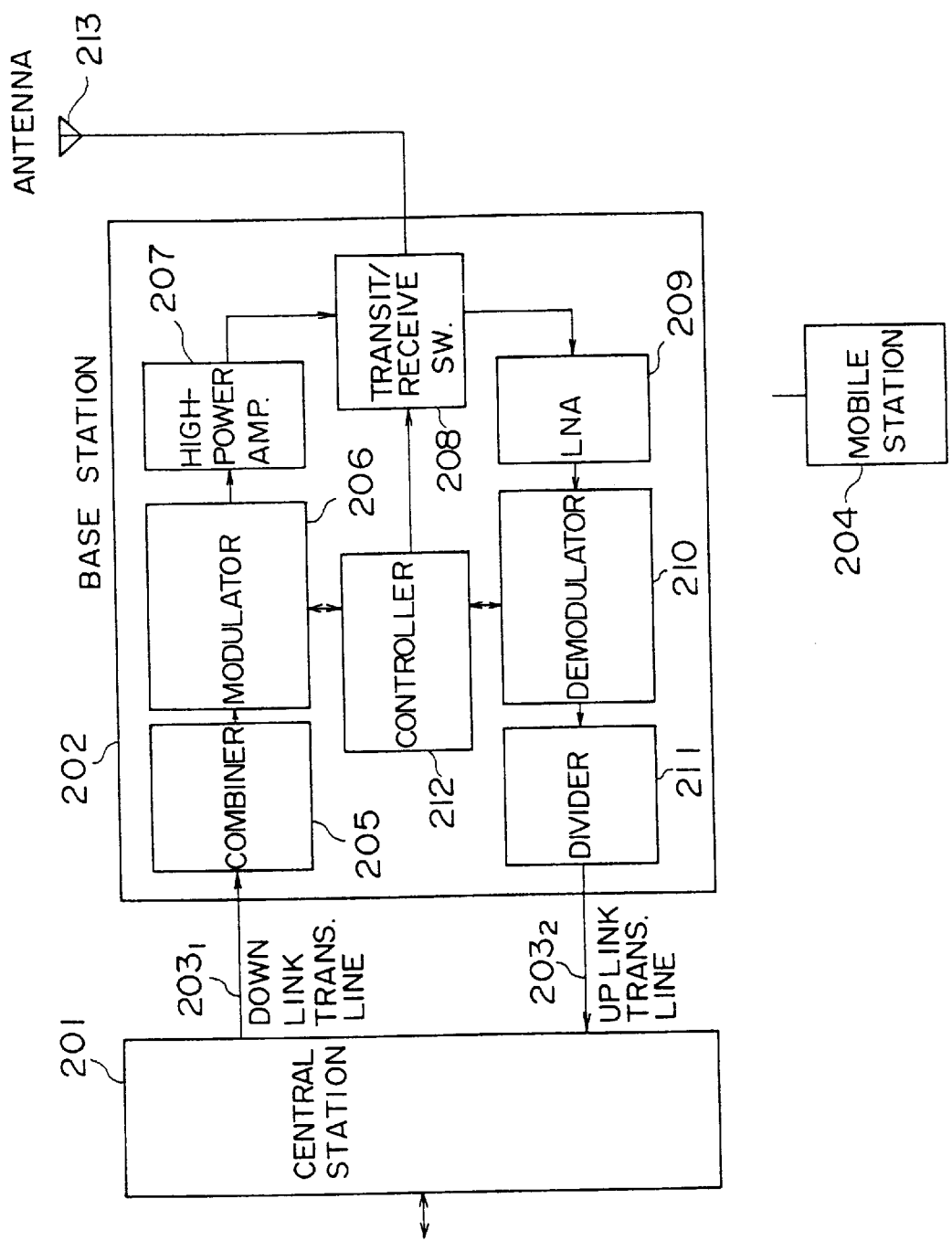
FIG. 1 is a block diagram for explaining a conventional mobile communication system.
Figure 2:
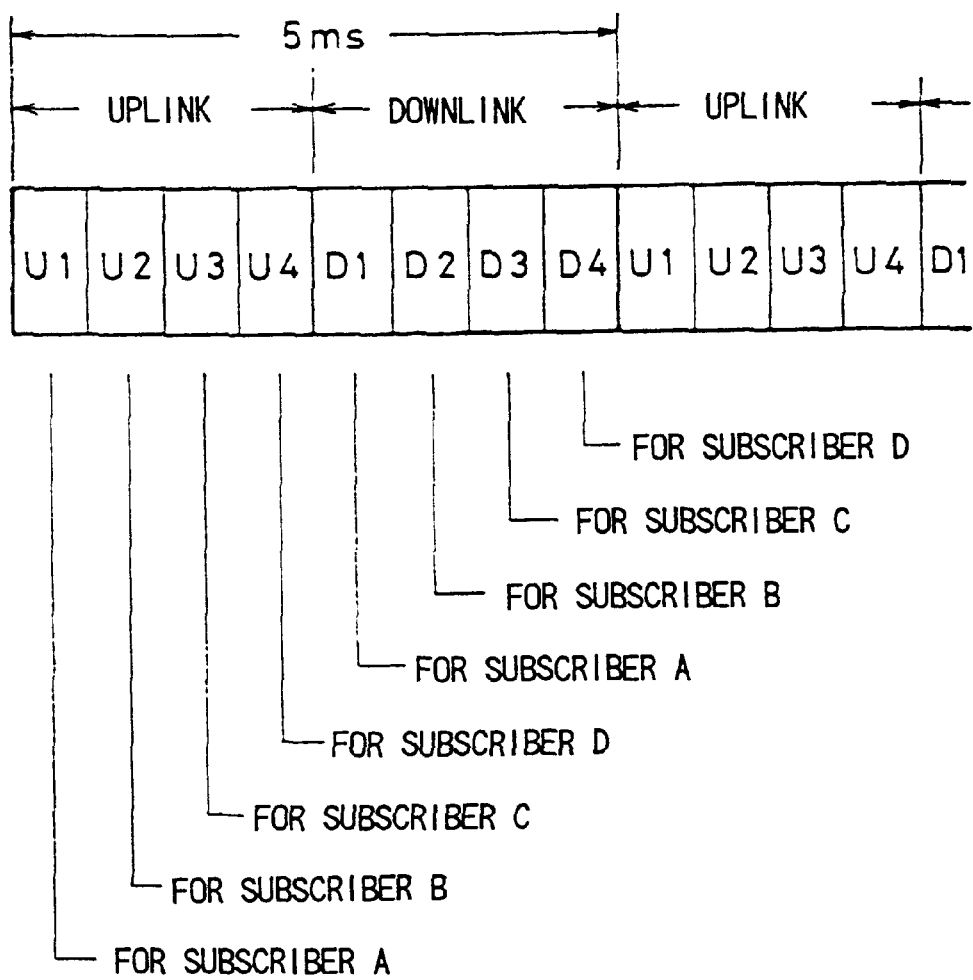
FIG. 2 shows a signal frame format of a TDMA/TDD system.
Figure 3:
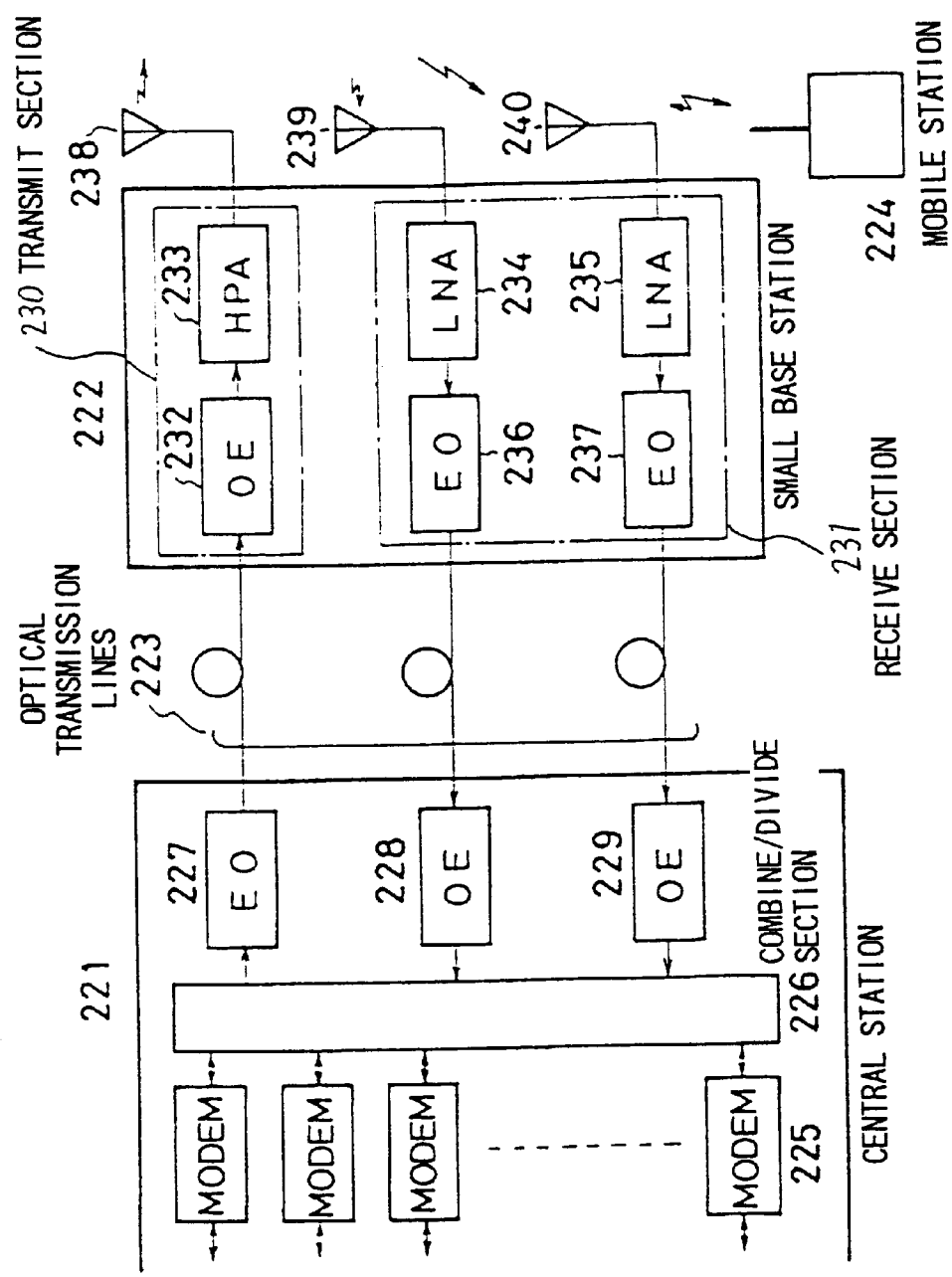
FIG. 3 is a block diagram for explaining a typical mobile communication system having a small base station.

The modulation section 15 in the central station 11 modulates carriers at a transmit frequency of 800 MHz band or 1.5 GHz band, etc., by a digital speech signal. A signal frame format in the TDMA/TDD system is shown in FIG. 2. Namely, this signal frame format reveals that the small base station 12 can communicate with four mobile stations at one frequency by time-divisional transmission or reception. Therefore, when using n frequency-different carriers, the small base station can communicate with 4n mobile stations by the time-divisional operation. Thus, the modulation section 15 includes modulating a plurality of carriers.

The electric/optic converter section 16 converts the output signal (high-frequency signal) of the modulation section 15 to an optical signal, and is constructed with a semiconductor laser. This optical signal is transmitted to the small base station 12 through the optical transmission lines 13.

In the small base station 12, by the optic/electric converter section 19, an optical signal, which is received through the optical transmission lines 13, is converted to an electrical signal (high-frequency signal), and is amplified by the transmit amplifier section 20. The bandpass filter 23 derives a carrier-part signal from the amplified signal and sends it to the envelope detector 24, which detects the carrier-part signal and provides a detected output signal to the comparator 25. The comparator 25 then compares the detected output signal with the a reference voltage and produces a discrimination signal which indicates a transmit timeslot to the changeable switch 26.

Figure 7:
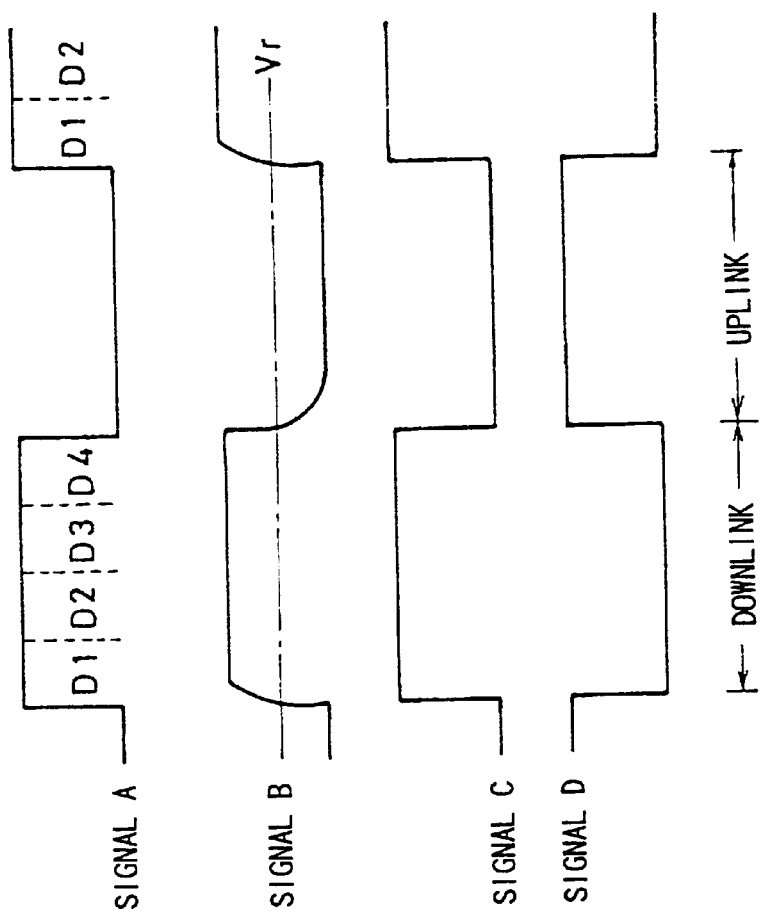
FIG. 7 shows timecharts for explaining detection of a transmit/receive switching signal in the first embodiment.

FIG. 7 shows timecharts for explaining detection of a transmit/receive switching signal according to the first embodiment. A signal A shows a transmit signal for each of the mobile stations in the TDMA/TDD system, a signal B shows the detected output signal of the envelope detector 24. By comparing the detected output signal with the reference voltage Vr through the comparator, a signal C, which shows the discrimination signal of the transmit timeslot (downlink) for the mobile station, is obtained. Next, by inverting the signal C, a signal D, which shows the discrimination signal of the receive timeslot (uplink) for the mobile station, is obtained.

The changeable switch 26 is controlled by the output signal of the comparator 25, such as the signal C or the signal D in FIG. 7. By the signal C, which indicates the discrimination signal of the transmit timeslot (downlink), the changeable switch 26 connects the transmit amplifier section 20 with the antenna 14, whereby the transmit signal for the mobile stations, which is represented by the signal A in FIG. 7, is transmitted through the antenna 14. And during the next timeslot, namely the receive timeslot (uplink), the changeable switch 26 connects the receive amplifier section 21 with the antenna 14, whereby the antenna receives a signal from the mobile station, and sends it to the receive amplifier section 21 which amplifies the signal. The amplified signal is converted to an optical signal through the electric/optic converter section 22, and is transmitted to the central station 11.

In the central station 11, the optic/electric converter section 17 converts the optical signal to an electrical signal (high-frequency signal), and sends it to the demodulation section 18. The demodulation section 18 demodulates the electrical signal and produces a baseband signal.

In this way, by installation of the relatively-simple transmit/receive switching control section in the small base station without an additional specific control signal for the central station 11, transmit/receive switching operation in accordance with the signal frame format of the TDMA/TDD system can be performed.

The optical transmission line 13 is constructed with two optical fibers for the uplink and downlink as shown in FIG. 6. However, if using a well-known optical combiner/divider, the optical transmission line 13 can be constructed with one optical fiber. In this case, a light wavelength of the electric/optic converter section 16 in central station 11 can be different from that of the electric/optic converter section 22 in the small base station 12.

Figure 8:
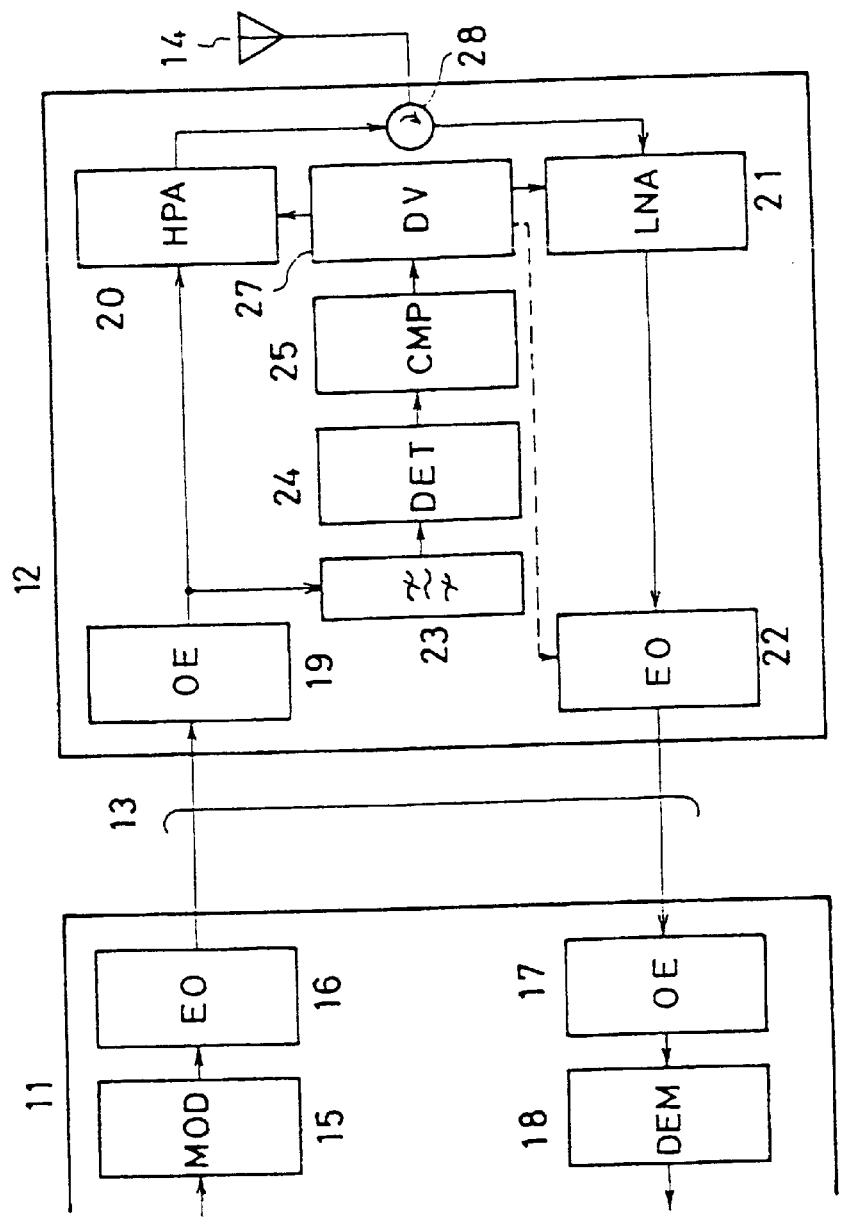
FIG. 8 is a block diagram of a second embodiment according to the present invention.

Next, a description will be given of a second embodiment of the mobile communication system having the small base station according to the present invention. FIG. 8 shows the block diagram for explaining the configuration of the second embodiment. In this system, a driving circuit (DV) 27 and a circulator 28 constructing a transmit/receive duplex are installed as a substitute for the changeable switch 26 in FIG. 6. In this embodiment, the driving circuit 27 controls both the transmit amplifier section (HPA) 20 and the receive amplifier section (LNA) 21 to either be activated or be deactivated. Namely, the bandpass filter 23, the envelope detector 24, the comparator 25, the driving circuit 27, and the circulator 28 construct the transmit/receive switching control section 13 shown in FIG. 5. In such construction, the bandpass filter 23 derives a carrier-part signal from the electrical signal which is converted by the optic/electric converter section (OE) 19, and sends it to the envelope detector (DET) 24. The envelope detector 24 detects the derived output signal, and produces the detected signal to the comparator (CMP) 25 which compares the detected signal with the reference voltage. The output signal of the comparator 25, which indicates a discrimination signal of the transmit timing for the mobile station is passed to the driving circuit 27. The driving circuit 27 drives to activate the transmit amplifier section 20 and to deactivate the receive amplifier section 21 in accordance with the discrimination signal. Thus, the transmit section for the mobile station is connected with the antenna 14, and the receive section is disconnected from the antenna 14.

On the other hand, during the next transmit timeslot, namely the receive timeslot, the driving circuit 27 drives to deactivate the transmit amplifier section 20 and drives to activate the receive amplifier section 21. Therefore, the transmit section for the mobile station is disconnected from the antenna 14, and the receive section is connected with the antenna 14. In this connective condition, the antenna 14 receives the signal from the mobile station, and sends it to the receive amplifier section 21. The signal is then amplified by its receive amplifier section 21, the amplified signal is passed to the electric/optic converter section 22 which converts the amplified signal to the optical signal and transmits it to the central station 11. In this way, the system, that the transmit amplifier section 20 and the receive amplifier section 21 are connected to the antenna 14 via the circulator 28, can also perform transmit/receive switching in accordance with the signal frame format of the TDMA/TDD system.

Figure 4:
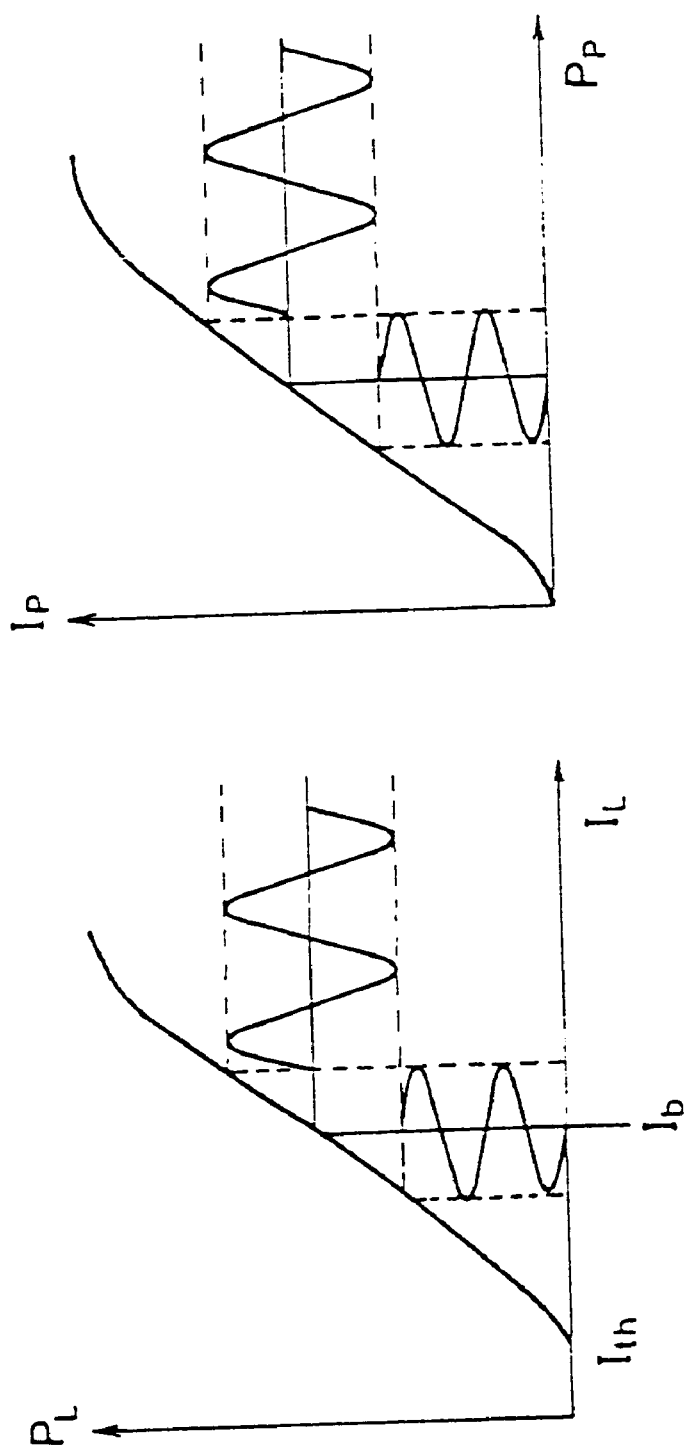
FIG. 4A and FIG. 4B show graphical representations for explaining transmitting and receiving characteristics of an optical signal.

And because during the transmit timeslot for the mobile station, the receive amplifier section 21 is deactivated, the electric/optic converter section (EO) 22 may be also deactivated by the control of the path from the driving circuit shown in a dotted line. On the other hand, during the receive timeslot for the mobile station, both the receive amplifier section 21 and the electric/optic converter section 22 are activated. In this case, control of activating or deactivating the electric/optic converter section 22 can be performed as follows: for example, in the characteristics of the semiconductor laser shown in FIG. 4, the bias current Ib is supplied during activation, and the current less than the threshold current Ith but larger than zero is supplied during the deactivation, further the electric/optic converter operation is controlled to directly start at the upward transition of the receive timeslot.

Figure 9:
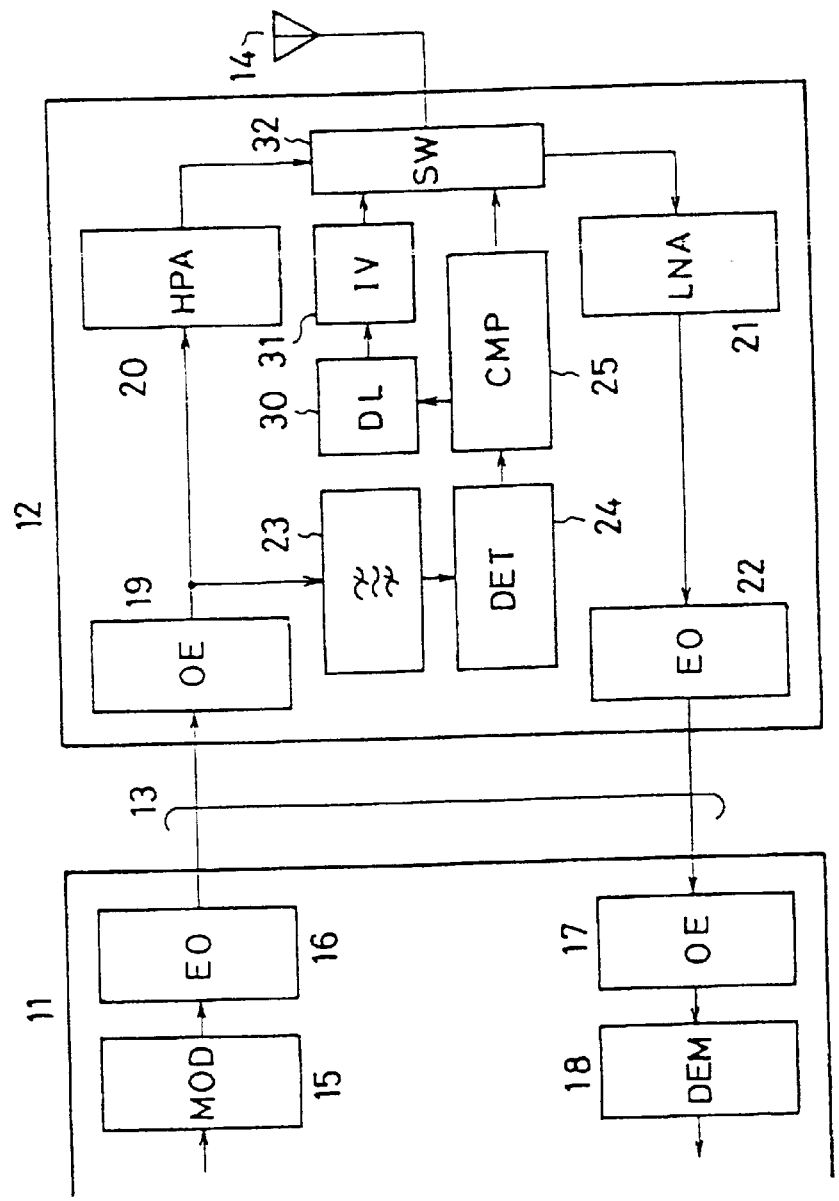
FIG. 9 is a block diagram of a third embodiment according to the present invention.

Next, a description will be given of a third embodiment of the mobile communication system having the small base station according to the present invention. FIG. 9 shows a block diagram for explaining the construction of the third embodiment. In this system, a delay circuit (DL) 30, an inverting circuit (IV) 31, and a changeable switch (SW) 32 are installed as a substitute for the changeable switch 26 in FIG. 6. In this embodiment, the bandpass filter 23, the envelope detector (DET) 24, the comparator (CMP) 25, the delay circuit 30, the inverting circuit (IV) 31, and the changeable switch 32 construct the transmit/receive switching control section 13 shown in FIG. 5.

In this embodiment, as the same way mentioned above by referring to FIG. 8, the discrimination signal of the transmit timeslot for the mobile station is obtained from the comparator 25. The delay circuit 30 delays the discrimination signal by the time corresponding to a guard time, etc., between the transmit timeslot and the receive timeslot. And subsequently, the inverting circuit 31 inverts the delayed discrimination signal and provides the discrimination signal which indicates the receive timeslot. Namely, if the signal C in FIG. 7 is assumed to be the discrimination signal of the transmit timeslot (downlink), its inverted signal D is identified to the discrimination signal of the receive timeslot (uplink).

And by controlling the changeable switch 32, the discrimination signal of the transmit timeslot makes the antenna 14 to be connected to the transmit amplifier section 20, and the discrimination signal of the receive timeslot makes the antenna 14 to be connected to the receive amplifier section 21. In this way, transmit/receive switching in accordance with the signal frame format of the TDMA/TDD system can be performed.

Figure 10:
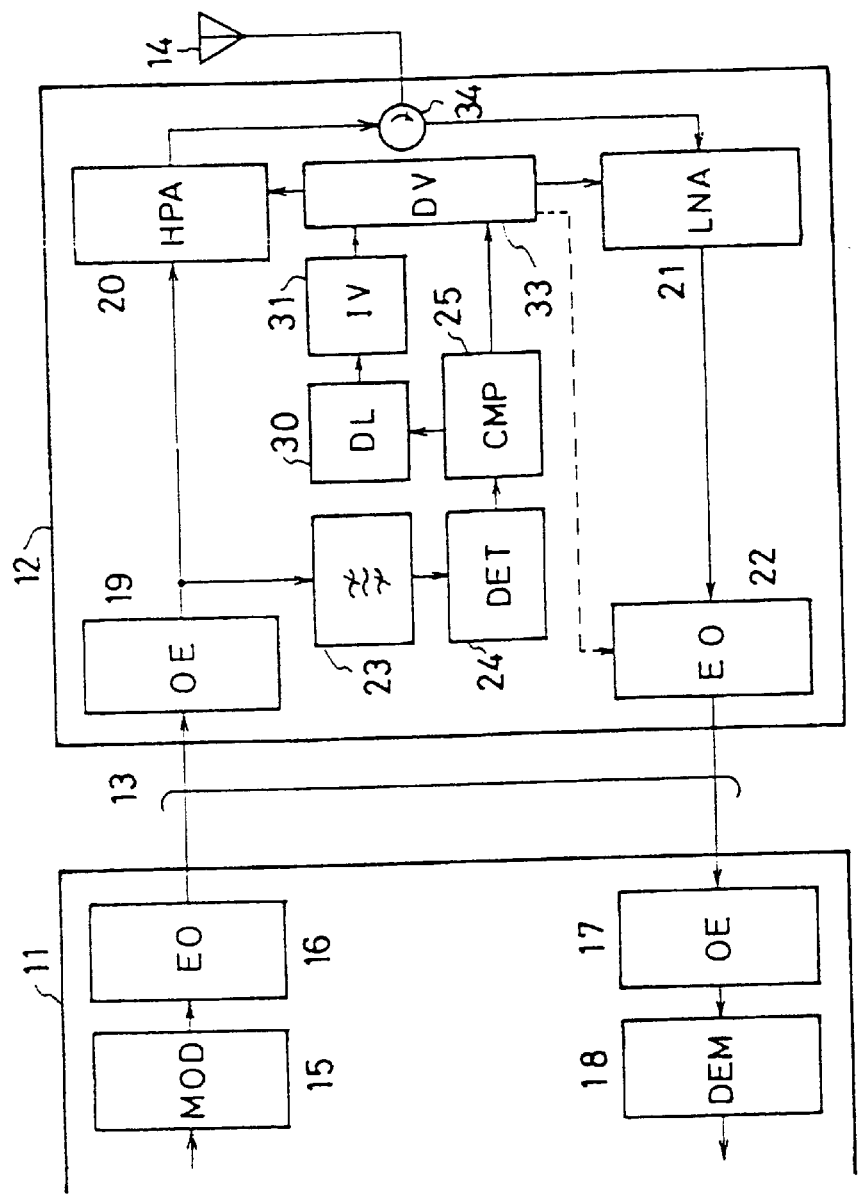
FIG. 10 is a block diagram of a fourth embodiment according to the present invention.

Next, a description will be given of a fourth embodiment of the mobile communication system having the small base station according to the present invention. FIG. 10 shows a block diagram for explaining the construction of the fourth embodiment. In this system, a driving circuit (DV) 33 and a circulator 34 are installed as a substitute for the changeable switch 32 in FIG. 9. In this embodiment, as described above with referred to the FIG. 9, the discrimination signal of the transmit timeslot for the mobile station is derived from the comparator 25, and the discrimination signal of the receive timeslot for the mobile station is derived from the inverting circuit 31. By the discrimination signal of the transmit timeslot, the driving circuit 33 activates the transmit amplifier (HPA) section 20, and deactivates the receive amplifier (LNA) section 21. In this way, the transmission for the mobile station is performed.

On the other hand, by the discrimination signal of the receive timeslot, the driving circuit 33 deactivates the transmit amplifier section 20, and activates the receive amplifier section 21. In this way, the signal from the mobile station is received. Further, as shown in a dotted line, the electric/optic converter section (E/O) 22 can also be deactivated when the receive amplifier section 21 is being deactivated during the transmit timeslot for the mobile station, or can be activated when the receive amplifier section 21 is being activated during the receive timeslot for the mobile station. Thus, transmit/receive switching in accordance with the signal frame format of the TDMA/TDD system can be performed.

Figure 11:
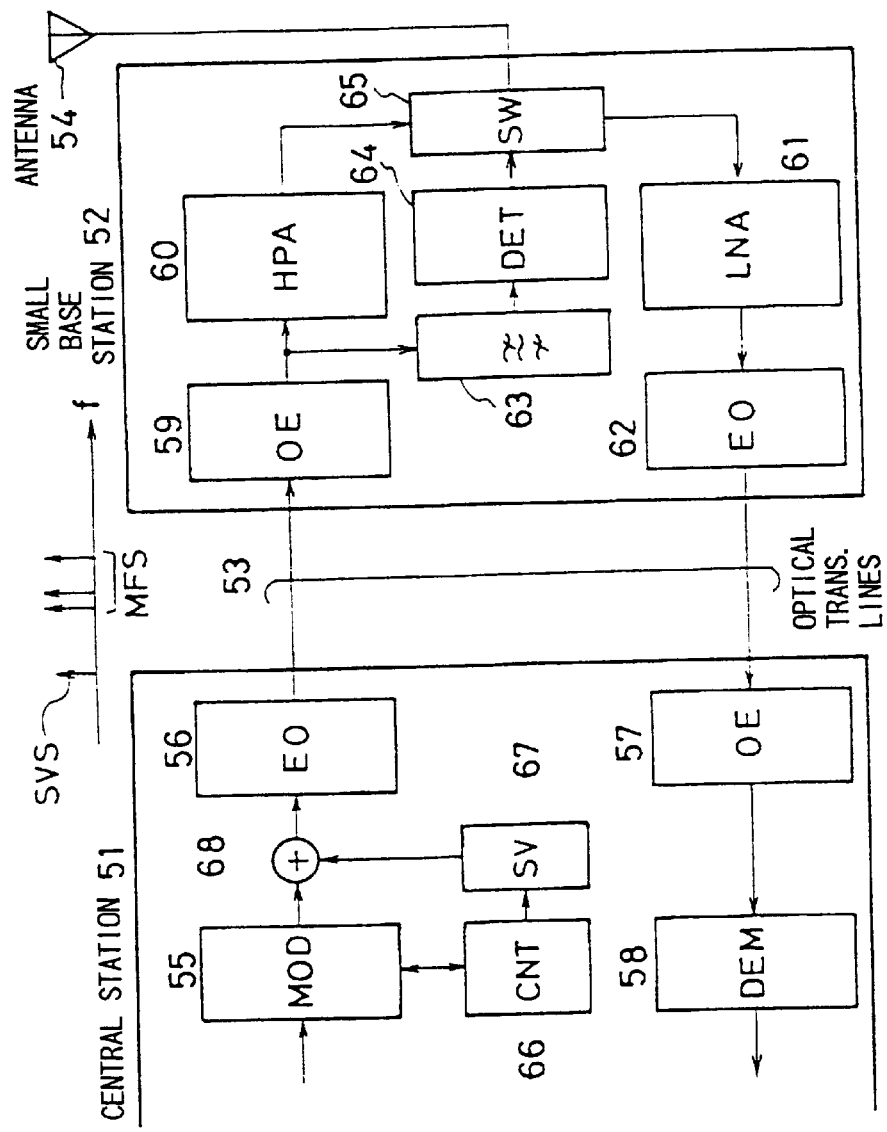
FIG. 11 is a block diagram of a fifth embodiment according to the present invention.

Next, a description will be given of a fifth embodiment of the mobile communication system having the small base station according to the present invention. FIG. 11 shows a block diagram for explaining the construction of the fifth embodiment. This system comprises a central station 51 and a small base station 52 connected to the central station 51 via optical transmission lines 53, the central station 51 having a modulation section (MOD) 55, an electric/optic converter section (EO) 56, an optic/electric converter section (OE) 57, a demodulation section (DEM) 58, a control circuit (CNT) 66, a control-signal generation circuit (SV) 67, and a summing circuit 68, and the small base station 52 having an antenna 54, an optic/electric converter section (OE) 59, a transmit amplifier section (HPA) 60, a receive amplifier section (LNA) 61, an electric/optic converter section (EO) 62, a bandpass filter 63, an envelope detector (DET) 64, and a changeable switch (SW) 65.

In this embodiment, the discrimination signals of the transmit timeslot and the receive timeslot for the mobile station are transmitted from the central station 51 to the small base station 52. The description of the transmission of the discrimination signals will be given in the following. In the modulation section 55, a plurality of carriers are modulated and are multiplexed to a main signal MFS. Further, the control signal SVS is multiplexed at a different frequency out of a dedicated frequency band with the main signal. Next, the control circuit 66 controls the transmit timeslot and the receive timeslot for the mobile station in accordance with the TDMA/TDD system. Namely, the control circuit 66 controls the control-signal generation circuit 67 to generate the discrimination signals of the transmit timeslot and the receive timeslot as control signals, and to apply the control signals to the summing circuit 68. In the summing circuit 68, the frequency-multiplexed main signal MFS from the modulation section 55 is further frequency-multiplexed with the control signal SVS, and is applied to the electric/optic converter circuit 56. The applied signal is converted to the optical signal and is transmitted to the small base station 52 through the optical transmission lines 53.

In the small base station 52, the optical signal from the central station 51 is converted to the electrical signal (radio frequency signal) by the optic/electric converter section 59. And subsequently, by the bandpass filter, the control signal SVS is derived from the electrical signal. The envelope detector 64 detects the control signal SVS, and applies the detected output signal to the changeable switch 65 as discrimination signals of the transmit timeslot and the receive timeslot. During the transmit timeslot, the transmit amplifier section 60 is connected to the antenna 54, and the main signal MFS from the central station 51 is transmitted to the mobile station. During the receive timeslot, the receive amplifier section 61 is connected to the antenna 54, and the received signal from the mobile station is amplified by the receive amplifier section 61. The amplified signal is converted to the optical signal by the electric/optic converter section 62, and is transmitted to the central station 51 through the optical transmission lines 53. In the central station 51, the optical signal is converted to the electrical signal (radio frequency signal) by the optic/electric converter section 57, and is demodulated to the baseband signal, etc., by the demodulation section 58. In this way, transmit/receive switching in accordance with the signal frame format of the TDMA/TDD system can be performed.

Figure 12:
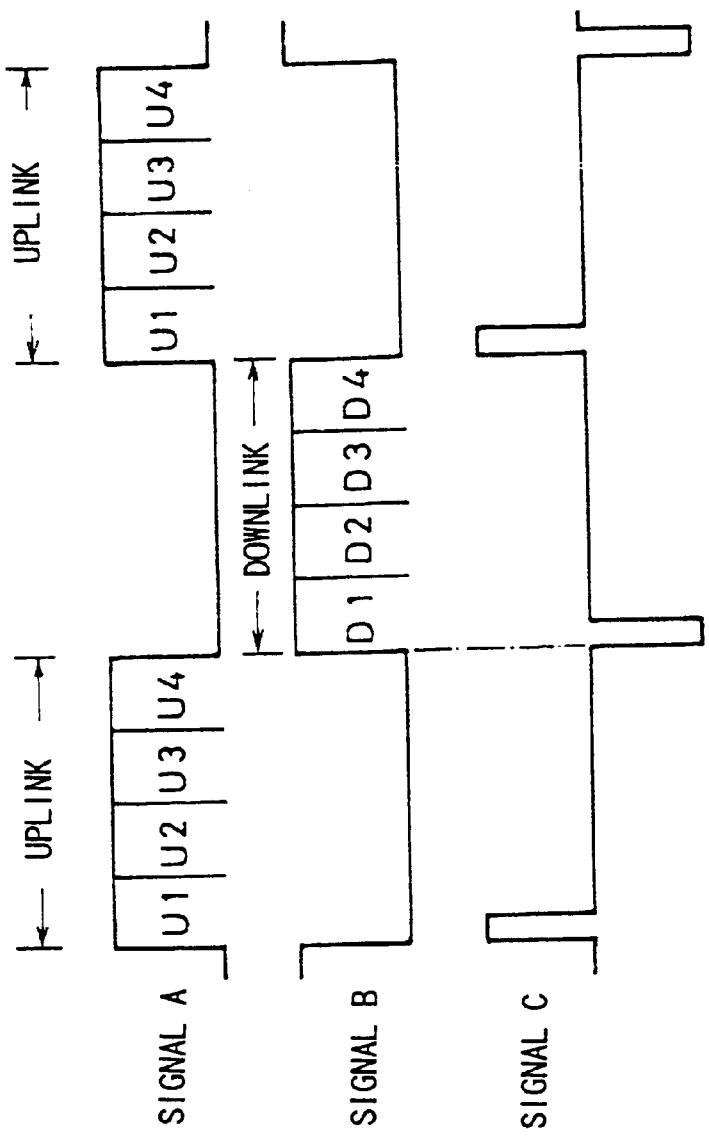
FIG. 12 shows timecharts for explaining operation of the fifth embodiment according to the present invention.

FIG. 12 shows timecharts for explaining an operation of the fifth embodiment. A signal A shows the receive timeslot (uplink) consisting of U1, U2, U3, and U4, a signal B shows the transmit timeslot (downlink) consisting of D1, D2, D3, and D4, and a signal C shows the discrimination signal for discriminating either the transmit timeslot or the receive timeslot. In each of signals, an illustration of the guard time is omitted because of simplicity of the description. The discrimination signal is obtained as a positive pulse for an upward transition of the receive timeslot, and as a negative pulse for an upward transition of the transmit timeslot. In the central station 51, the original discrimination is frequency-multiplexed to the main signal MFS, and is transmitted to the small base station 52. In the small base station 52, through the deriving of a control signal part in the bandpass filter 63 and the detecting in the envelope detector 64, the discrimination signal shown in the signal C is obtained. This discrimination signal is not specified in the signal form of the signal C, and may be formed in any signal form which may discriminate either the transmit timeslot or the receive timeslot, such as signal C or signal D shown in FIG. 7.

Figure 13:
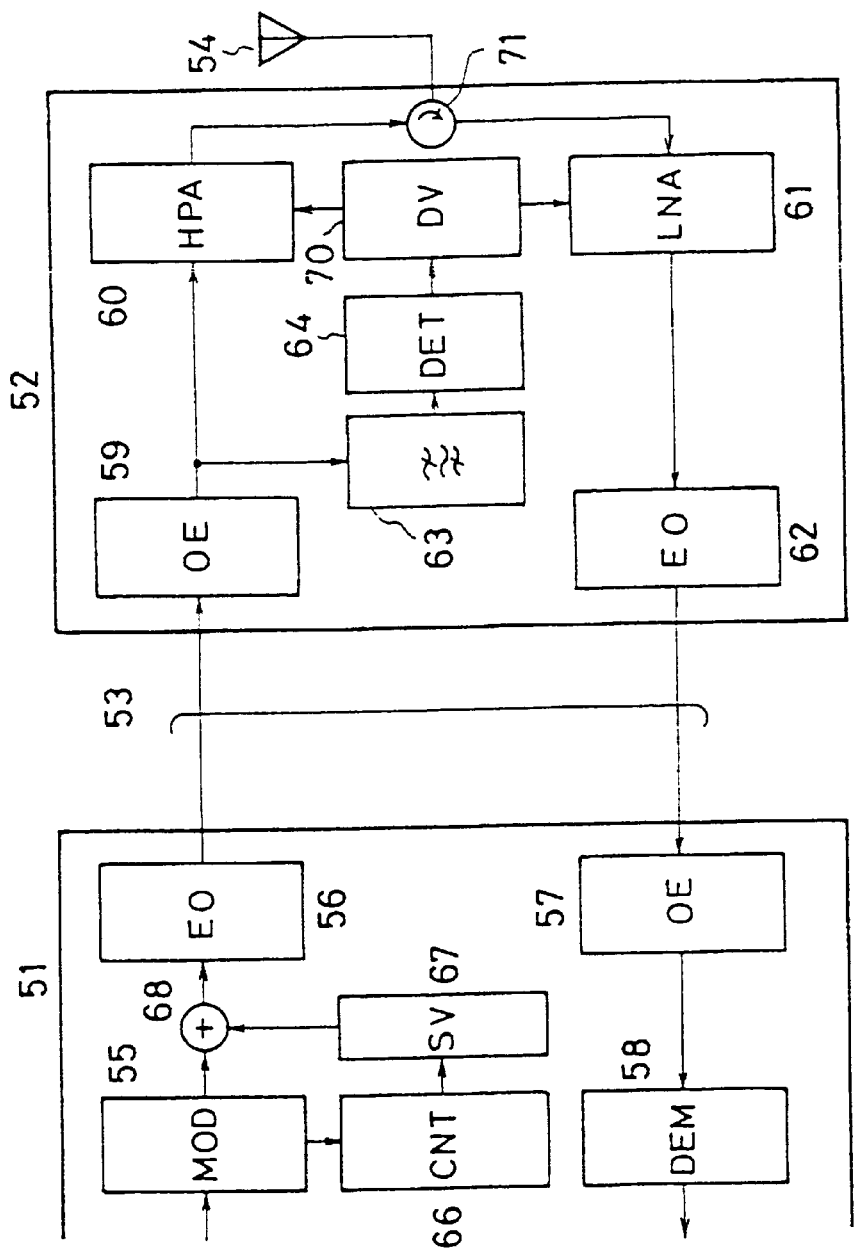
FIG. 13 is a block diagram of a sixth embodiment according to the present invention.

Next, a description will be given of a sixth embodiment of the mobile communication system having the small base station according to the present invention. FIG. 13 shows a block diagram for explaining the construction of the sixth embodiment. In this system, a driving circuit (DV) 70, and a circulator 71 are installed as substitutes for the changeable switch 65 shown in FIG. 11. As in the operation of the embodiment shown in FIG. 11, in the central station 51, the discrimination signal of the transmit timeslot and the receive timeslot, as the control signal SVS, is frequency-multiplexed to the main signal MFS, and is transmitted to the small base station 52. The small base station 52 derives the control signal SVS, and recovers the discrimination signal which is applied to the driving circuit 70. The driving circuit 70 activates the transmit amplifier section 60 and deactivates the receive amplifier section 61 during the transmit timeslot, or deactivates the transmit amplifier section 60 and activates the receive amplifier section 61 during the receive timeslot. In this way, transmit/receive switching operation in accordance with the signal frame format of the TDMA/TDD system can be performed.

Figure 14:
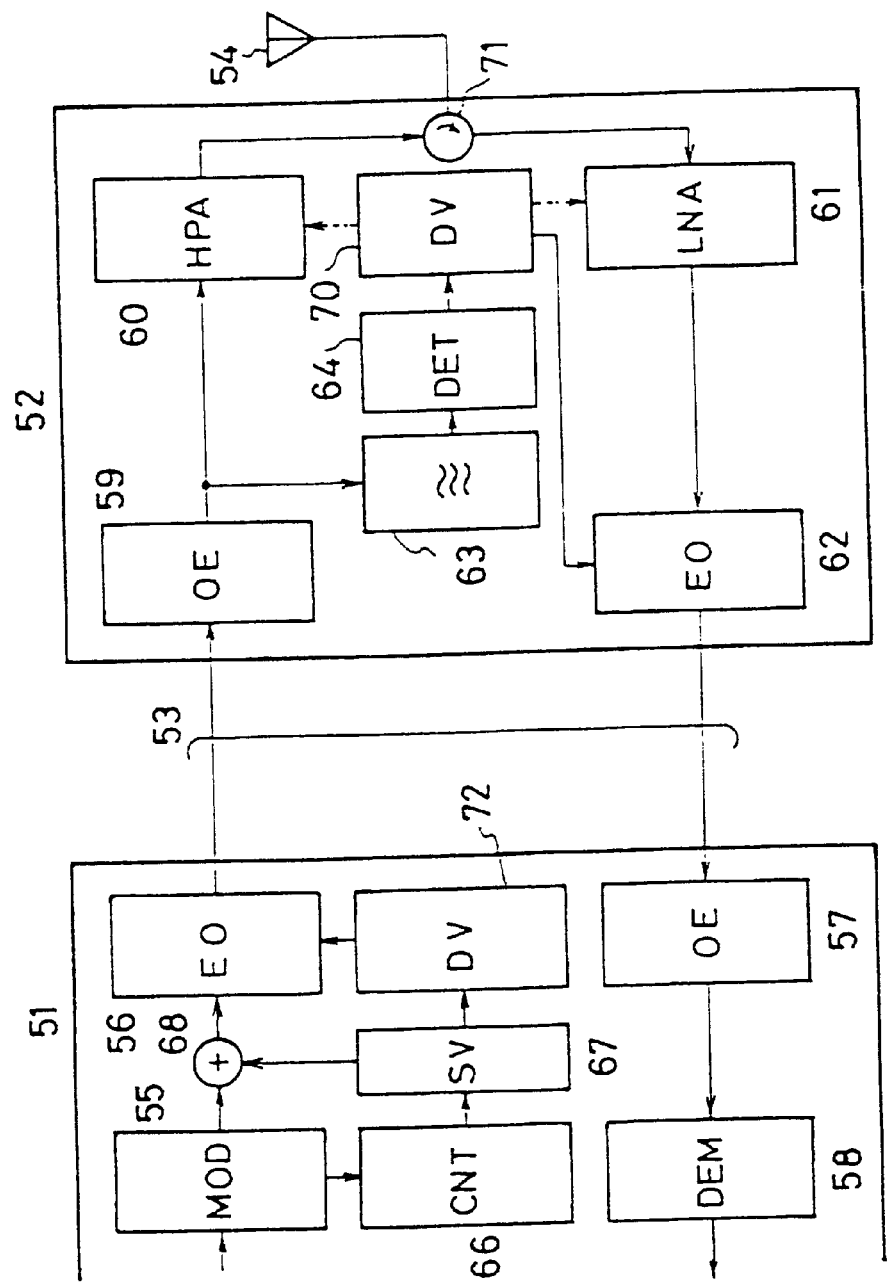
FIG. 14 is a block diagram of a seventh embodiment according to the present invention.

Next, a description will be given of a seventh embodiment of the mobile communication system having the small base station according to the present invention. FIG. 14 shows a block diagram for explaining the construction of the seventh embodiment. In this system, a driving circuit (DV) 72 is installed in addition to the system shown in FIG. 13. In this embodiment, the driving circuit 72 controls the electric/optic converter section 56 to be deactivated during the receive timeslot for the mobile station. In further detail, the discrimination signal of the receive timeslot, as the control signal SVS, is frequency-multiplexed to the main signal MFS, and is converted to the optical signal, which is transmitted to the small base station 52. After that, the operation of the electric/optic converter section 56 is deactivated by the driving circuit 72 during the receive timeslot.

In the small base station 52, the transmit/receive switching control section having the bandpass filter 63, the envelope detector 64, and the driving circuit 70, recovers the discrimination signal of the transmit timeslot and the receive timeslot from the central station 51. And subsequently, the driving circuit 70 deactivates the operation of the electric/optic converter section 62 during the transmit timeslot. Namely, transmit/receive switching operation is performed in the way that, during the receive timeslot for the mobile station the electric/optic converter 56 in the central station 51 is deactivated, and during transmit timeslot the electric/optic converter section 62 in the small base station is deactivated.

In this case, as shown in dotted lines from the driving circuit 70, by the discrimination signal of the transmit timeslot, the driving circuit 70 activates the transmit amplifier section 60 and deactivates the receive amplifier section 61, and by the discrimination signal of the receive timeslot, the driving circuit 70 deactivates the transmit amplifier section 60 and activates the receive amplifier section 61. In this way, transmit/receive switching operation in accordance with the signal frame format of the TDMA/TDD system can be performed.

Figure 15:
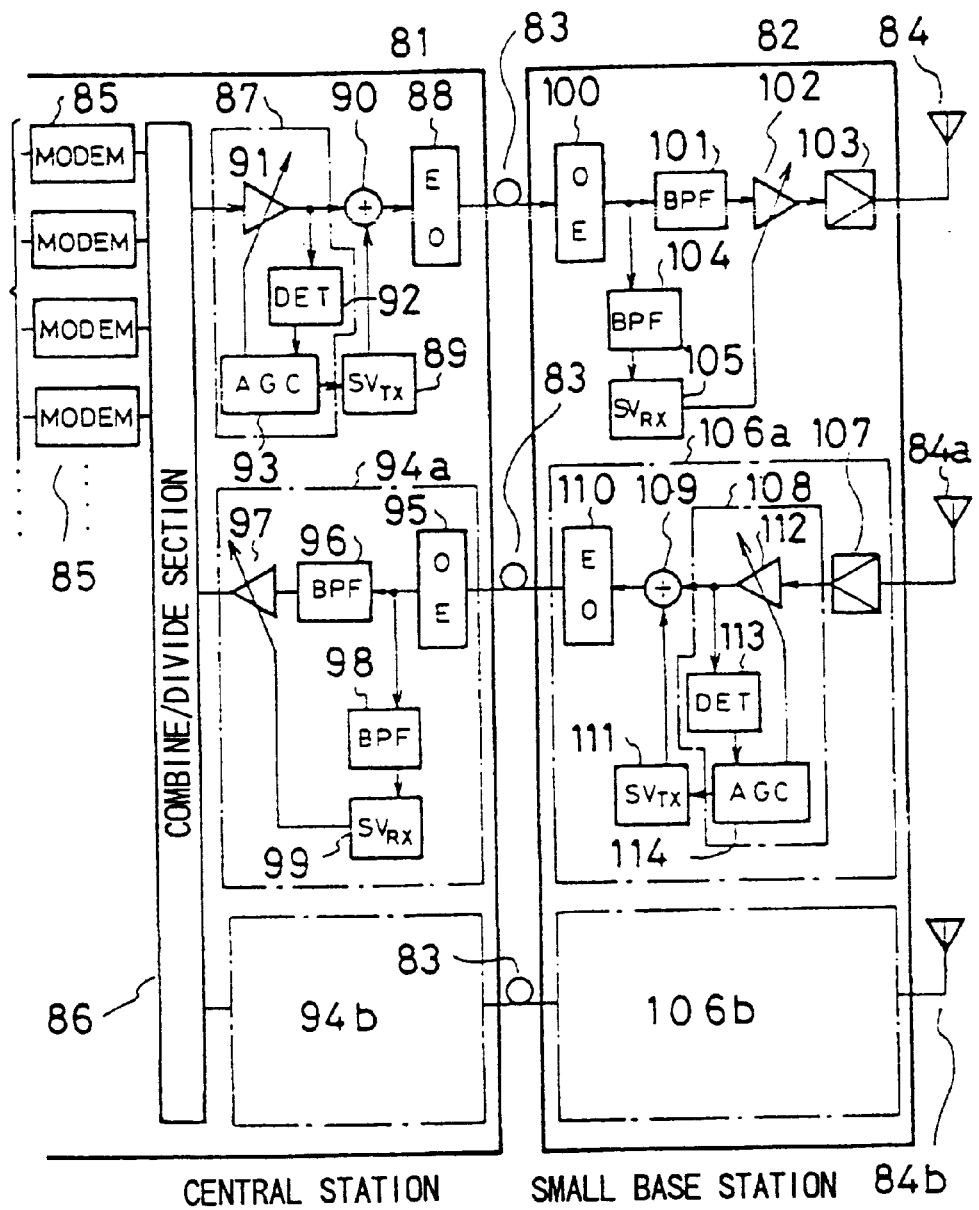
FIG. 15 is a block diagram of an eighth embodiment according to the present invention.

Next, a description will be given of an eighth embodiment of the mobile communication system having the small base station according to the present invention. FIG. 15 shows a block diagram for explaining the construction of the eighth embodiment. This system comprises a central station 81 and a small base station 82 which is connected to the central station 81 via optical transmission lines 83. The central station 81 further comprises modulation/demodulation sections (MODEMS) 85, a combine/divide section 86, an automatic-gain-control amplifier section 87 including a gain-control amplifier 91, a detector (DET) 92, and an AGC section (AGC) 93, an electric/optic converter section (EO) 88, a control-signal generation section ($SV_{TX}$) 89, a summing circuit 90, and small-base-station-signal receiving sections 94a, 94b, each of them including an optic/electric converter section (OE) 95, bandpass filters (BPF) 96, 98, a gain-control amplifier section 97, and a control-signal receiving section ($SV_{RX}$) 99. The small base station 82 further comprises a transmit antenna 84, receive antennas 84a, 84b, an optic/electric converter section (OE) 100, bandpass filters 101, 104, a gain-control amplifier section 102, a transmit amplifier section 103, a control-signal receiving section ($SV_{RX}$) 105, and receive sections 106a, 106b, each of them including a receive amplifier section 107, an automatic-gain-control amplifier section 108, a summing circuit 109, electric/optic converter section (EO) 110, and a control-signal generation section ($SV_{TX}$) 111. The automatic-gain-control amplifier section 108 further includes a gain-control amplifier 112, a detector (DET) 113, and an AGC section (AGC) 114.

In this system, a space diversity receiving system is applied with two receive antennas 84a, 84b. Therefore, the receive sections 106a, 106b in the small base station 82 have the same configurations, and the small-base-station-signal receiving sections 94a, 94b in the central station 81 also have the same configurations. In the same way mentioned in the previous embodiments, a single antenna may also be used for both transmission and reception and if so, a transmit/receive switching operation is performed in accordance with the signal format of TDMA/TDD system. Although, in FIG. 15, the optical transmission lines 83 are constructed of three optical fibers, the optical transmission line can be constructed with only a single fiber by using a well known optical combiner/divider.

The automatic-gain-control amplifier sections 87, 108 control their output power to be constant by means of detecting the output power levels of the gain-control amplifiers 91, 112 by the detectors 92, 113, and controlling the gains of the gain-control amplifiers 91, 112 by gain-control information which is produced in the AGC sections 93, 114. On the other hand, the gain-control information is applied to the control-signal generation sections 89, 111, in which control signals are produced at a different frequency from the main signal's frequency band. The control signals are frequency-multiplexed to the main signal by the summing circuits 90, 109.

The combine/divide section 86 combines a plurality of modulated signals which have different frequencies. Therefore, the total power of the combined signal may be in relation to the number of carriers. However, in the optical transmission, a constant power level is required for the optical signals to be transmitted. To meet this requirement, the signal levels to the electric/optic converter sections 88, 110 may be controlled to be constant by the automatic-gain-control amplifier sections 87,108.

In the small base station 82, a frequency-multiplexed signal to the mobile station needs to have the power level in proportion to the number of the carriers to ensure designed service area. However, if the power level into the electric/optic converter section 88 is controlled to be constant independent of the number of the carriers, the frequency-multiplexed signal to the mobile station has always the constant power level which may not be the desired power level for a large number of carriers. In this case, the transmission power level per carrier is reduced, so that the received power level at the mobile station is also reduced. This result may cause a problem of degradation of the carrier to noise ratio (C/N) at the mobile station.

To overcome this problem, this system according to the present invention is operative according to the following descriptions.

The gain-control information in the automatic-gain-control amplifier sections 87, 108, are applied to the summing circuits 90, 109 as the control signals through the control-signal generation sections 89, 111. The control signals are frequency-multiplexed to the main signals by the summing circuits 90, 109, and are converted to the optical signal by the electric/optic converter sections 88, 110, which are transmitted into the opposite station.

In the small base station 82, the optical signal is converted to the electrical signal (radio-frequency signal) by the electric/optic converter section 100. The main signal is derived from the bandpass filter 101, and is applied to the gain-control amplifier section 102. The output signal of the gain-control amplifier section 102 is amplified by the transmit amplifier section 103 and is transmitted from the transmit antenna 84. On the other hand, the control signal part is derived from the output signal (radio-frequency signal) of the optic/electric converter section 100 by the bandpass filter 104, and is received and discriminated by the control-signal receive section 105 which produces the gain-control information. By this gain-control information, the gain-control amplifier section 102 is controlled to produce the signal of the desired power level for transmission.

When the number of the carriers in the central station 81 is large, the gain of the automatic-gain-control amplifier section 87 is controlled by the its gain-control information to fix the output level. However, the gain-control information is also transmitted to the small base station 82 with the main signal, and is used for increasing the gain of the gain-control amplifier section 102 by control of the control-signal receive section 105. Thus, the input signal level of the transmit amplifier section 103 is increased to the desired level. In this way, the input signal level of the transmit amplifier section 103 may be equivalent to the output signal level of the combine/divide section 86, while the total level of the optical signal through the optical transmission lines is kept to be constant.

In the receive sections 106a, 106b in the small base station 82, the automatic-gain-control amplifier section 108 is controlled by its the gain-control information to fix the input signal level of the electric/optic converter section 110. In the same way mentioned above, the gain-control information is transmitted to the central station 81 by frequency-multiplexing. In the central station 81, from the frequency-multiplexed signal, the bandpass filter 98 derives the control signal part which is received at the control-signal receive section 99. The control-signal receive section 99 discriminates the gain-control information from the control signal part, by which the gain of the gain-control amplifier section 97 is controlled to obtain the same level as or greater than the output signal level of the receive amplifier section 107. The amplified signal of the gain-control amplifier section 97 is divided into the signals per carrier in the combine/divide section 86. In this way, each level of the divided signal from the combine/divide section 86 becomes the appropriate level for demodulation in relation to the received signal level per carrier, while the total level of the optical signal through the optical transmission lines is kept to be constant.

Figure 16:
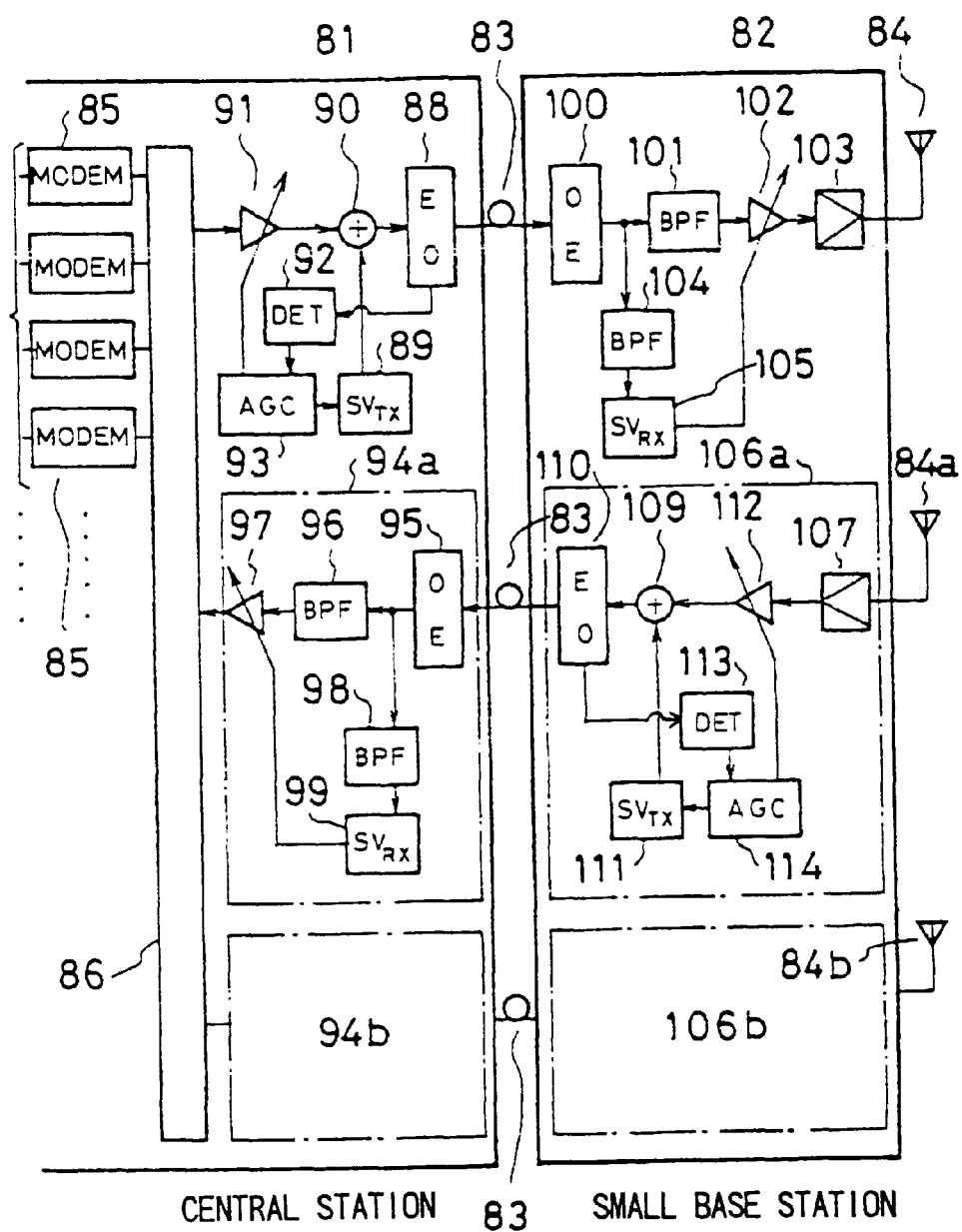
FIG. 16 is a block diagram of a ninth embodiment according to the present invention.

Next, a description will be given of a ninth embodiment of the mobile communication system having the small base station according to the present invention. FIG. 16 shows a block diagram for explaining the construction of the ninth embodiment. In this figure, the same reference numerals as that in FIG. 15 are used to indicate corresponding elements. In this system, the gains of the gain-control amplifiers 91, 112 are controlled by detecting the optical output of the electric/optic converter sections 88, 110 as a substitute for the output signal of the gain-control amplifiers 91, 112. In the case that the electric/optic converter sections 88, 110 are constructed with semiconductor lasers, as well known, an optical monitor, which is obtained from the opposite side of the output side in the semiconductor laser, can be detected by a photodiode. The gains of the gain-control amplifiers 91, 112 are controlled to fix the detected output signal at a given value. The gain-control information used for this control is transmitted to the small base station 82 by the frequency-multiplexing with the main signal and by the conversion to the optical signal.

In the small base station 82 and the small-base-station-signal receive sections 94a, 94b in the central station 81, in the same way as the previous embodiment, gain-control information, which is derived through the bandpass filters 98, 104, and the control-signal receive sections 99, 105, may control the gain-control amplifier sections 97, 102 to output the signals having the level in relation to the number of carriers.

Figure 17:
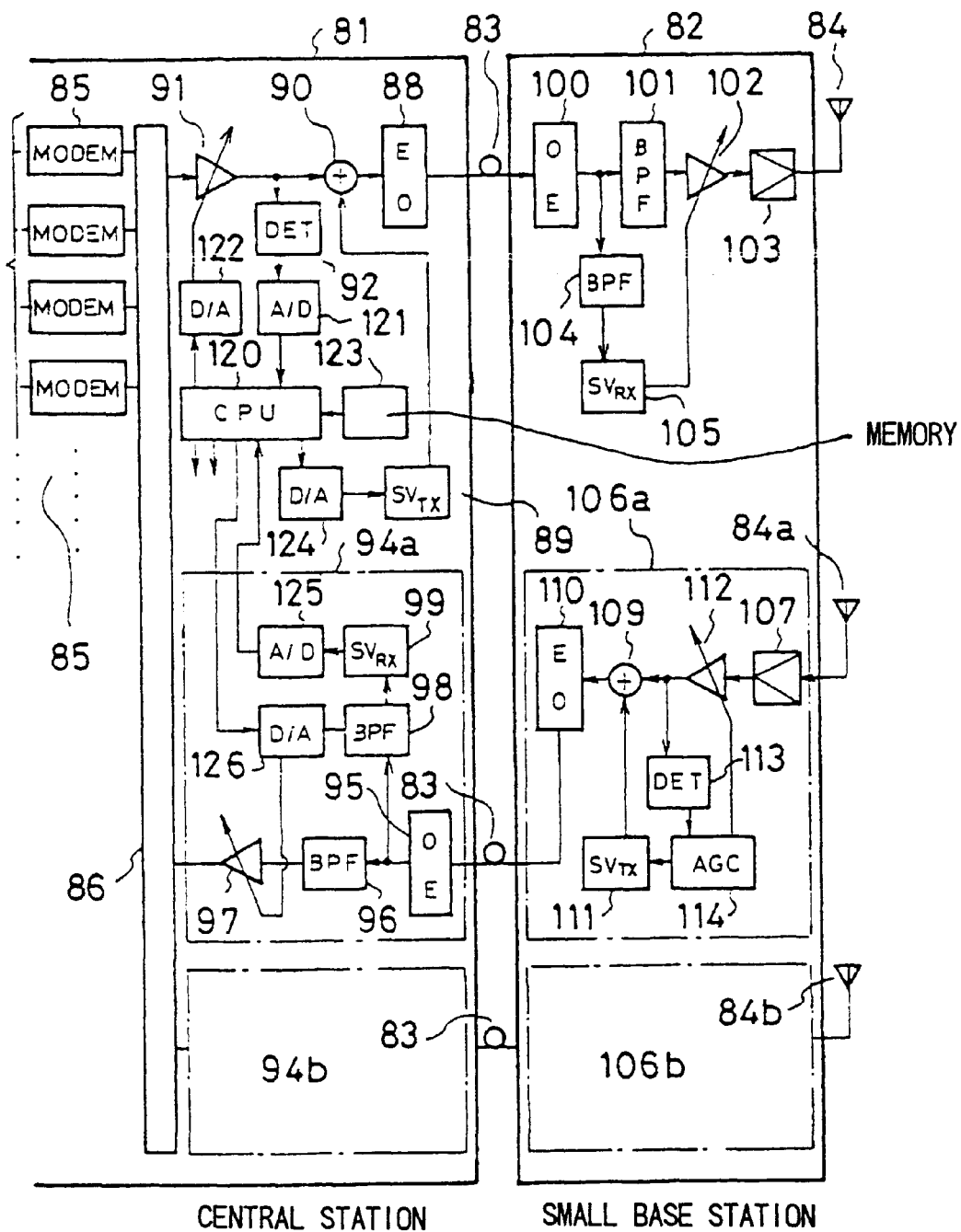
FIG. 17 is a block diagram of a tenth embodiment according to the present invention.

Next, a description will be given of a tenth embodiment of the mobile communication system having the small base station according to the present invention. FIG. 17 shows a block diagram for explaining the construction of the tenth embodiment. In this system, a processor (CPU) 120, an analog-to-digital converter (A/D) 121, digital-to-analog converters (D/A) 122, 124, and a memory 123 are installed in the central station 81 as a substitute for the AGC section 93 shown in FIG. 15. Further, an analog-to-digital converter 125 and a digital-to-analog converter 126 are installed in the small-base-station-signal receive sections 94a, 94b. The memory 123 is used for storing the gains being set to the gain-control amplifier 91 and the gain-control amplifier section 97.

In this embodiment, the output signal of the gain-control amplifier 91 is detected by the detector 92, and is converted to a digital signal by the analog-to-digital converter 121, and to the processor 120. In the processor, the gain to be set to the gain-control amplifier 91 is calculated based on the gain information of the gain-control amplifier 91 stored in the memory 123. The calculated gain is converted to an analog gain-control signal by the digital-to-analog converter 122, and controls the gain-control amplifier 91. Further, another analog gain-control signal converted by the digital-to-analog converter 124 is applied to the control-signal generation section 89, which produces the control signal indicating gain-control information to be frequency-multiplexed to the main signal.

The small base station is operative in the same way as the previous embodiments. The gain-control amplifier section 102 is controlled according to the gain-control information, and the output signal of the transmit amplifier section 103, which is in relation to the number of the carriers, is transmitted.

On the other hand, the gain-control information, which has been frequency-multiplexed to the main signal in the receive section 106a, 106b, are derived by the bandpass filter 98 in the small-base-station-signal receive sections 94a, 94b in the central station 81. The derived gain-control information is received and discriminated in the control-signal receive section 99, and is converted to a digital signal by the analog to digital converter 125, and to the processor 120.

This processor 120 calculates the gain of the gain-control amplifier section 97 based on the received gain-control information and on the gain of the gain-control amplifier section 97 stored in the memory 123. This calculated gain is converted to an analog gain-control signal by the digital to analog converter 126, which controls the gain-control amplifier section 97. Therefore, the signal whose level is in relation to the number of the carriers, is applied to the combine/divide section 86.

Because a loss in the optical transmission lines 83 can be previously obtained, the processor 120 can easily perform a gain compensation by taking account of the loss during processing the gain control. Therefore, the gain can be controlled to compensate the performance degradation of each section according to the number of the carriers which is varied in relation to a call traffic.

Figure 18:
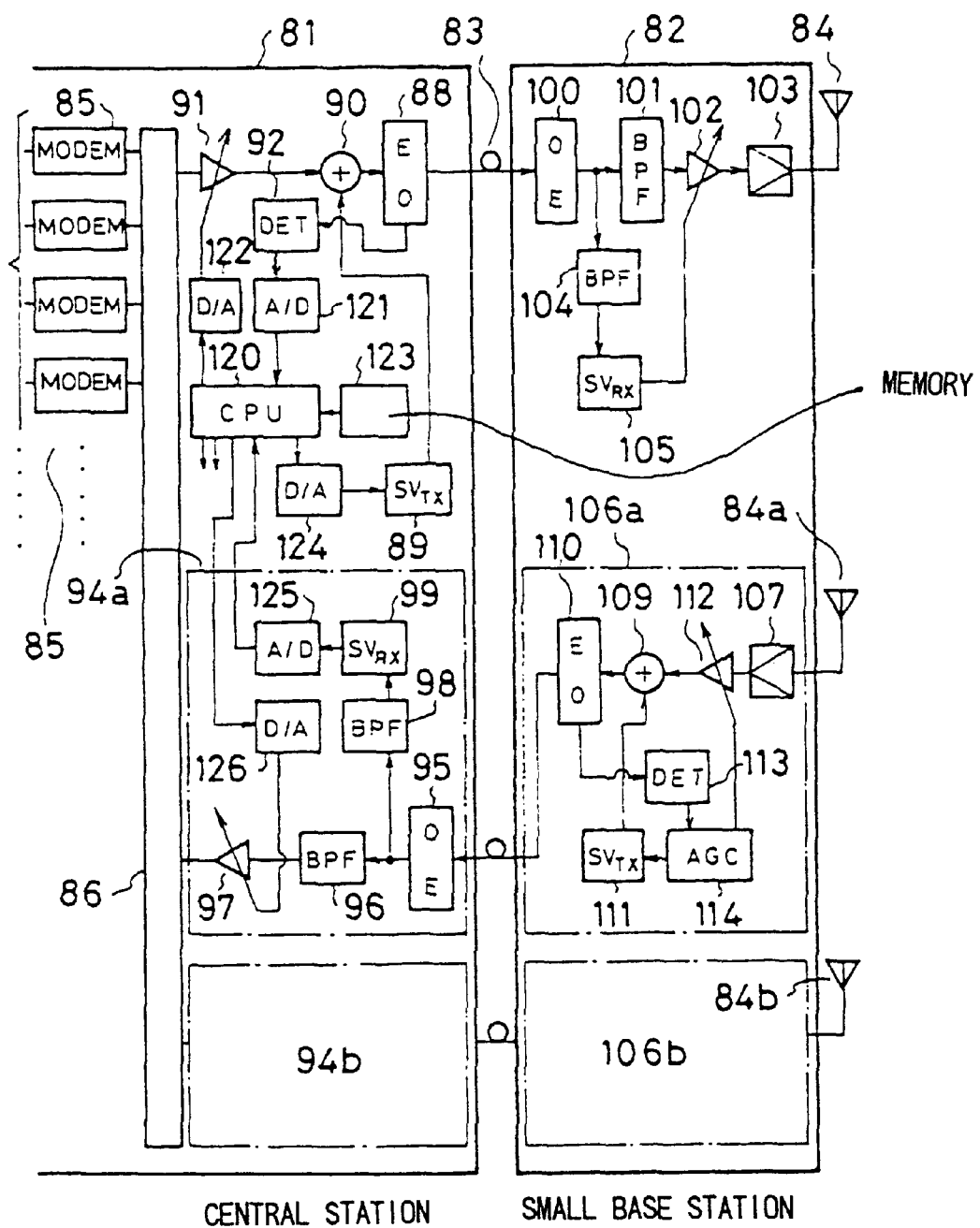
FIG. 18 is a block diagram of an eleventh embodiment according to the present invention.

Next, a description will be given of an eleventh embodiment of the mobile communication system having the small base station according to the present invention. FIG. 18 shows a block diagram for explaining the construction of the eleventh embodiment. This embodiment is constructed by combining the two embodiments in FIG. 16 and FIG. 17. In this figure, the same reference numerals as that in FIG. 16 and FIG. 17 are used to indicate corresponding elements. In this system, the automatic-gain-control amplifier section detects the optical output signal or the optical monitor of the electric/optic converter section 88, and based on the detected signal, the processor 120 controls the gain-control amplifier 91. The control-signal generation section 89 generates the gain-control information as a control signal, which is frequency-multiplexed to the main signal and is converted to the optical signal. In the small base station 82, the gain-control amplifier section 102 is controlled by the derived gain-control information, so that the main signal to the transmit amplifier section 103 is controlled to have the power level in relation to the number of the carriers.

In the receive sections 106*a*, 106*b* of the small base station 82, as in the same way of the previous embodiment, the gain-control information of the automatic-gain-control amplifier section is frequency-multiplexed to the main signal and is converted to the optical signal, and to the central station 81. In the small-base-station-signal receive section 94*a*, 94*b* of the central station 81, the derived gain-control information is applied to the processor 120, which controls the gain-control amplifier section 97, and the output signal, having the level in relation to the number of the carriers, is applied to the combine/divide section 86.

As described above, the present inventions have the following features. The present invention, constructed such that a large number of the small base stations located in various areas are connected to the central station via the optical transmission lines, whereby the modulation section and the demodulation section are installed only in the central station, enables cost reduction and miniaturization of the small base station. The present invention is also constructed such that the transmit/receive switching control section, in which the switching operation is performed in accordance with the signal frame format of the TDMA/TDD system, is installed in the small base station, and is controlled by detecting the signal which is transmitted from the central station. This configuration has an advantage that a conventional configuration of the central station is usable. Further, the present invention is constructed as that the discrimination signal of the transmit timeslot and the receive timeslot for the mobile station from the central station, is multiplexed to the main signal by the frequency multiplication, etc., and is transmitted to the small base station. This configuration has an advantage that the transmit/receive switching operation in the small base station is easily controlled.

The present invention is also constructed such that the frequency-multiplexed signal is transmitted from the small base station, and the optical signal level through the optical transmission lines between the central station and the small base station is controlled to be a given value by the installed automatic-gain-control amplifier section. In this configuration, furthermore, the gain-control information is transmitted by frequency multiplexing with the main signal, the gain-control amplifier section is controlled by the gain-control information, so that the main signal, of which level is in relation to the number of the carriers, can be obtained. Thus, this configuration has an advantage that high-quality mobile communication may be performed.

Further, the present invention is not limited to these embodiments, but various variations and modifications may be made without departing from the scope of the present invention.

For example, a configuration applicable to the present invention is that the gain-control signals, which compensate for the loss of the optical transmission lines 83, are added to the gain-control amplifier section 97, 102 by the control-signal receive section 99, 105 in the previous embodiments. Further, another configuration applicable to the present invention is that in the case of including the single antenna for transmit and receive, and also including the transmit/receive switching in accordance with the signal format of the TDMA/TDD system in the small base station 82, the discrimination signal of the transmit timeslot and the receive timeslot for the mobile station with the gain-control information mentioned above, is frequency-multiplexed to the main signal, and in the small base station 82, the gain-control information and the discrimination signal are derived respectively to control other sections.

What is claimed is:

1. A mobile communication system comprising a base station and a central station, said base station being connected to said central station via an optical transmission line, said base station time-divisionally performing a transmitting operation and a receiving operation using a transmit timeslot and a receive timeslot at the same frequency between the base station and a mobile station;

wherein:

said central station comprises:

modulation means for modulating a time-division multiple signal;

electric/optic converter means for converting an output signal of said modulation means to an optical signal during said transmit timeslot for said mobile station, and sending the optical signal to said optical transmission line;

optic/electric converter means for receiving an optical signal from said base station via said optical transmission line during said receive timeslot for said mobile station, and converting the received optical signal to an electrical signal; and demodulation means for demodulating an output signal from said optic/electric converter means; and said base station comprises:

optic/electric converter means for receiving the optical signal from said central station via said optical transmission line, and converting the received optical signal to an electrical signal;

transmit amplifier means for amplifying an output signal from said optic/electric converter means;

receive amplifier means for amplifying a received signal from the mobile station;

electric/optic converter means for converting an output signal of said receive amplifier means to an optical signal, and sending the optical signal to said central station via said optical transmission line; and switching control means, coupled to said transmit amplifier means and said receive amplifier means, for detecting the output signal of said optic/electric converter means, and discriminating said transmit timeslot for said mobile station, and time-divisionally switching said transmitting operation and said receiving operation based on the discriminated transmit timeslot for said mobile station.

2. The mobile communication system as claimed in claim 1, wherein said switching control means of said base station comprises:

discrimination means for discriminating said transmit timeslot for said mobile station from a detected output signal which is obtained by detecting the output signal of said optic/electric converter means; and a changeable switch for supplying an output signal of said transmit amplifier means to an antenna during said transmit timeslot discriminated by said discrimination means, and supplying a received signal from said antenna to said receive amplifier means during said receive timeslot next to said transmit timeslot.

3. The mobile communication system as claimed in claim 1, wherein said switching control means of said base station comprises:

discrimination means for discriminating said transmit timeslot for said mobile station from a detected output signal which is obtained by detecting the output signal of said optic/electric converter means; and control means for activating said transmit amplifier means and deactivating said receive amplifier means during said transmit timeslot discriminated by said discrimination means, or deactivating said transmit amplifier means and activating said receive amplifier means during said receive timeslot next to said transmit timeslot.

4. The mobile communication system as claimed in claim 1, wherein said switching control means of said base station comprises:

discrimination means for discriminating said transmit timeslot for said mobile station from a detected output signal which is obtained by detecting the output signal of said optic/electric converter means; and control means for activating said transmit amplifier means and deactivating said receive amplifier means and said electric/optic converter means during said transmit timeslot discriminated by said discrimination means, or deactivating said transmit amplifier means and activating said receive amplifier means and said electric/optic converter means during said receive timeslot next to said transmit timeslot.

5. The mobile communication system as claimed in claim 1, wherein said switching control means of said base station comprises:

a bandpass filter for receiving the output signal of said optic/electric converter means;

an envelope detector for receiving an output signal of said bandpass filter;

a comparator for comparing an output signal of said envelope detector with a reference voltage;

a delay circuit for delaying an output signal of said comparator; and an inverting circuit for inverting an output signal of said delay circuit;

wherein:

the output signal of said inverting circuit is used as a discrimination signal of said receive timeslot for said mobile station; and the output signal of said comparator is used as a discrimination signal of said transmit timeslot for said mobile station.

6. The mobile communication system as claimed in claim 5, wherein said switching control means of said base station further comprises discrimination means for discriminating said transmit timeslot for said mobile station from a detected output signal which is obtained by detecting the output signal of said optic/electric converter means, and a changeable switch for supplying an output signal of said transmit amplifier means to an antenna during said transmit timeslot discriminated by said discrimination means, and supplying a received signal from said antenna to said receive amplifier means during said receive timeslot next to said transmit timeslot and wherein said switching control means controls said changeable switch for transmitting and receiving by using both the discrimination signal of said receive timeslot which is the output of said inverting circuit and the discrimination signal of said transmit timeslot which is the output of said comparator.

7. The mobile communication system as claimed in claim 5, wherein said switching control means of said base station deactivates said transmit amplifier means and activates said receive amplifier means and said electric/optic converter means by the discrimination signal of said receive timeslot which is the output of said inverting circuit, or activates said transmit amplifier means and deactivates one or either of said receive amplifier means and said electric/optic converter means by the discrimination signal of said transmit timeslot which is the output of said comparator.

8. A mobile communication system comprising a central station and a base station connected to said central station via an optical transmission line, said base station time-divisionally performing a transmitting operation and a receiving operation using a transmit timeslot and a receive timeslot at the same frequency between the base station and a mobile station;

wherein:

said central station comprises:

modulation means for modulating a time-division multiple signal;

electric/optic converter means for converting an output signal of said modulation means to an optical signal during said transmit timeslot for said mobile station, and sending the optical signal to said optical transmission line;

optic/electric converter means for receiving the optical signal from said base station via said optical transmission line during said receive timeslot for said mobile station, and converting a received optical signal to an electrical signal;

demodulation means for demodulating an output signal from said optic/electric converter means; and control-signal multiplex means for multiplexing a control signal which indicates said transmit timeslot and said receive timeslot to the output signal of said modulation means at a different frequency from that of the output signal; and said base station comprises:

optic/electric converter means for receiving the optical signal from said central station via said optical transmission line, and converting the received optical signal to an electrical signal;

transmit amplifier means for amplifying an output signal from said optic/electric converter means;

receive amplifier means for amplifying a received a signal from the mobile station;

electric/optic converter means for converting an output signal of said receive amplifier section to an optical signal, and sending the optical signal to said central station via said optical transmission line; and switching control means, coupled to said transmit amplifier means and said receive amplifier means, for deriving said control signal from the output signal of said optic/electric converter, and time-divisionally switching said transmitting operation and said receiving operation for said mobile station by the derived control signal.

9. The mobile communication system as claimed in claim 8, wherein said switching control means of said base station comprises:

control-signal detecting means for disassembling the output signal of said optic/electric converter means and detecting said control signal; and a changeable switch for supplying an output signal of said transmit amplifier means to an antenna during said transmit timeslot for said mobile station according to said control signal, and supplying a received signal from said antenna to said receive amplifier means during said receive timeslot according to said control signal.

10. The mobile communication system as claimed in claim 8, wherein said switching control means of said base station comprises:

control-signal detecting means for disassembling the output signal of said optic/electric converter means and detecting said control signal; and control means for activating said transmit amplifier means and deactivating said receive amplifier means during said transmit timeslot for said mobile station according to said control signal, and deactivating said transmit amplifier means and activating said receive amplifier means during said receive timeslot according to said control signal.

11. The mobile communication system as claimed in claim 10, wherein said electric/optic converter means of said central station is controlled to be activated during said transmit timeslot for said mobile station, and to be deactivated during said receive timeslot for said mobile station.

12. The mobile communication system as claimed in claim 8, wherein said switching control means of said base station comprises:

control-signal detecting means for disassembling the output signal of said optic/electric converter means and detecting said control signal; and control means for activating said transmit amplifier means and deactivating said receive amplifier means and said electric/optic converter means during said transmit timeslot for said mobile station according to said control signal, and deactivating said transmit amplifier means and activating said receive amplifier means and said electric/optic converter means during said receive timeslot according to said control signal.

13. The mobile communication system as claimed in claim 12, wherein said electric/optic converter means of said central station is controlled to be activated during said transmit timeslot for said mobile station, and to be deactivated during said receive timeslot for said mobile station.

14. A mobile communication system comprising a central station and a base station connected to said central station via an optical transmission line, said base station providing radio communications between the base station and a mobile station;

wherein:

said central station comprises:

modulation means for modulating a time-division multiple signal;

automatic-gain-control amplifier means for amplifying an output signal of said modulation means;

electric/optic converter means for converting an output signal of said automatic-gain-control amplifier means with gain-control information in the automatic-gain-control amplifier means to an optical signal, and sending the optical signal to said optical transmission line;

optic/electric converter means for receiving an optical signal from said base station via said optical transmission line, and converting the received optical signal to an electrical signal;

gain-control amplifier means for amplifying an output signal of said optic/electric converter means according to gain-control information from said base station; and demodulation means for demodulating an output signal of said gain-control amplifier means;

said base station comprises:

optic/electric converter means for receiving the optical signal from said central station via said optical transmission line, and converting the received optical signal to an electrical signal;

gain-control amplifier means for amplifying an output signal of said optic/electric converter means according to the gain-control information from said central station;

automatic-gain-control amplifier means for amplifying a received signal from said mobile station; and electric/optic converter means for converting an output signal of said automatic-gain-control amplifier means with gain-control information in the automatic-gain-control amplifier means to an optical signal, and sending the optical signal to said central station via said optical transmission line.

15. The mobile communication system as claimed in claim 14, wherein:

said automatic-gain-control amplifier means of said central station detects an optical output monitor of said electric/optic converter means of said central station, and controls gain thereof so as to maintain output power of said electric/optic converter means to be a given power level; and said automatic-gain-control amplifier means of said base station detects an optical output monitor of said electric/optic converter means of said base station, and controls gain thereof so as to maintain output power of said electric/optic converter means to be a given power level.

16. The mobile communication system as claimed in claim 15, wherein said automatic-gain-control amplifier means comprises a processor which processes to correct said gain-control information being combined with the output signal of said automatic-gain-control amplifier means, and processes to correct a gain-control information from said base station and sends the corrected gain-control information to said gain-control amplifier section means.

17. The mobile communication system as claimed in claim 14, wherein said automatic-gain-control amplifier means comprises a processor which processes to correct said gain-control information being combined with the output signal of said automatic-gain-control amplifier means, and processes to correct a gain-control information from said base station and sends the corrected gain-control information to said gain-control amplifier section means.

18. A base station equipment for time-divisionally transmitting or receiving a time-division multiple signal to or from a mobile station using a transmit timeslot or a receive timeslot of a signal frame format, the base station equipment comprising:

optic/electric converter means for receiving said time-division multiple signal as an optical signal from a central station coupled to the base station equipment via an optical transmission line, and converting the received optical signal to an electrical signal;

transmit amplifier means for amplifying an output signal from said optic/electric converter section means;

receive amplifier means for amplifying a received signal from said mobile station;

electric/optic converter means for converting an output signal of said receive amplifier means to an optical signal, and sending the optical signal to said central station via said optical transmission line; and switching control means, coupled to said transmit amplifier means and said receive amplifier means, for detecting the output signal of said optic/electric converter means, discriminating said transmit timeslot for said mobile station, and switching a transmitting operation and a receiving operation, based on the discriminated timeslot, for said mobile station.

19. The base station equipment as claimed in claim 18, wherein said switching control means comprises:

discrimination means for discriminating said transmit timeslot for said mobile station from a detected output signal which is obtained by detecting the output signal of said optic/electric converter means; and a changeable switch for supplying an output signal of said transmit amplifier means to an antenna during said transmit timeslot discriminated by said discrimination means, and supplying a received signal from said antenna to said receive amplifier means during said receive timeslot next to said transmit timeslot.

20. The base station equipment as claimed in claim 18, wherein said switching control means comprises:

discrimination means for discriminating said transmit timeslot for said mobile station from a detected output signal which is obtained by detecting the output signal of said optic/electric converter means;

control means for activating said transmit amplifier means and deactivating said receive amplifier means during said transmit timeslot discriminated by said discrimination means, or deactivating said transmit amplifier section and activating said receive amplifier means during said receive timeslot next to said transmit timeslot.

21. Central station equipment for time-divisionally transmitting or receiving a time-division multiple signal to or from a base station connected to the central station equipment via an optical transmission line using a transmit timeslot or a receive timeslot of a signal frame format for a mobile station, the central station equipment comprising:

modulation means for modulating said time-division multiple signal;

electric/optic converter means for converting an output signal of said modulation means to an optical signal during said transmit timeslot for said mobile station, and sending the optical signal to said optical transmission line;

optic/electric converter means for receiving the optical signal from said base station via said optical transmission line during said receive timeslot for said mobile station, and converting a received optical signal to an electrical signal;

demodulation means for demodulating an output signal from said optic/electric converter means; and control-signal multiplex means for multiplexing a control signal which indicates said transmit timeslot and said receive timeslot to the output signal of said modulation means at a different frequency from that of the output signal.

22. A base station equipment for time-divisionally transmitting or receiving a time-division multiple signal to or from a mobile station using a transmit timeslot or a receive timeslot of a signal frame format, the base station equipment comprising:

optic/electric converter means for receiving said time-division multiple signal as an optical signal from a central station connected to the base station equipment via an optical transmission line, and converting the received optical signal to an electrical signal;

transmit amplifier means for amplifying an output signal from said optic/electric converter means;

receive amplifier means for amplifying a received signal from the mobile station;

electric/optic converter means for converting an output signal of said receive amplifier means to an optical signal, and sending the optical signal to said central station via said optical transmission line; and switching control means, coupled to said transmit amplifier means and said receive amplifier means, for deriving a control signal which indicates one of said transmit timeslot and said receive timeslot from the output signal of said optic/electric converter means, and for time-divisionally switching a transmitting operation and a receiving operation for said mobile station by the derived control signal.

23. The base station equipment as claimed in claim 22, wherein said switching control means comprises:

control-signal detecting means for disassembling the output signal of said optic/electric converter means and detecting said control signal; and a changeable switch for supplying an output signal of said transmit amplifier means to an antenna during said transmit timeslot for said mobile station according to said control signal, and supplying a received signal from said antenna to said receive amplifier means during said receive timeslot according to said control signal.

24. The base station equipment as claimed in claim 22, wherein said switching control means comprises:

control-signal detecting means for disassembling the output signal of said optic/electric converter means and detecting said control signal; and control means for activating said transmit amplifier means and deactivating said receive amplifier means during said transmit timeslot for said mobile station according to said control signal, and deactivating said transmit amplifier means and activating receive amplifier means during said receive timeslot according to said control signal.

25. Central station equipment, for transmitting or receiving a time-division multiple signal to or from a base station connected to the central station equipment via an optical transmission line using a transmit timeslot or a receive timeslot of a signal frame format for a mobile station, the central station equipment comprising:

modulation means for modulating said time-division multiple signal;

automatic-gain-control amplifier means for amplifying an output signal of said modulation means;

electric/optic converter means for converting an output signal of said automatic-gain-control amplifier means with gain-control information in the automatic-gain-control amplifier means to an optical signal, and sending the optical signal to said optical transmission line;

optic/electric converter means for receiving an optical signal from said base station via said optical transmission line, and converting the received optical signal to an electrical signal;

gain-control amplifier means for amplifying an output signal of said optic/electric converter means according to gain-control information from said base station; and demodulation means for demodulating an output signal of said gain-control amplifier means.

26. A base station equipment for transmitting or receiving a time-division multiple signal to or from a mobile station using a transmit timeslot or a receive timeslot of a signal frame format, the base station equipment comprising:

optic/electric converter means for receiving a time-division multiple signal as an optical signal from a central station connected to the base station equipment via an optical transmission line, and converting the received optical signal to an electrical signal;

gain-control amplifier means for amplifying an output signal of said optic/electric converter means according to the gain-control information from said central station, and transmitting an amplified signal;

automatic-gain-control amplifier means for amplifying a received signal from said mobile station; and electric/optic converter means for converting an output signal of said automatic-gain-control amplifier means with gain-control information in the automatic-gain-control amplifier means to an optical signal, and sending the optical signal to said central station via said optical transmission line.

* * * * *